(12) United States Patent
Minoshima et al.

(10) Patent No.: US 12,072,933 B2
(45) Date of Patent: Aug. 27, 2024

(54) RECORDING APPARATUS, METHOD OF CONTROLLING SAME, EXTERNAL APPARATUS, AND STORAGE MEDIUM

(71) Applicant: CANON KABUSHIKI KAISHA, Tokyo (JP)

(72) Inventors: Toshio Minoshima, Kanagawa (JP); Tomoaki Komiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 11 days.

(21) Appl. No.: 17/844,631

(22) Filed: Jun. 20, 2022

(65) Prior Publication Data

US 2022/0405325 A1    Dec. 22, 2022

(30) Foreign Application Priority Data

Jun. 22, 2021  (JP) ................................ 2021-103550
Jun. 29, 2021  (JP) ................................ 2021-108056

(51) Int. Cl.
*G06F 16/70*  (2019.01)
*G06F 16/738*  (2019.01)
*G06F 16/74*  (2019.01)
*G06F 16/78*  (2019.01)
*G06F 16/783*  (2019.01)

(52) U.S. Cl.
CPC .......... *G06F 16/743* (2019.01); *G06F 16/738* (2019.01); *G06F 16/783* (2019.01); *G06F 16/7867* (2019.01)

(58) Field of Classification Search
CPC .... G06F 16/738; G06F 16/743; G06F 16/783; G06F 16/7867; G11B 27/031; G11B 27/102; G11B 27/327
See application file for complete search history.

(56) References Cited

U.S. PATENT DOCUMENTS

| 2005/0165848 | A1  | 7/2005 | Kusama |
| 2008/0005128 | A1* | 1/2008 | Jayaraman ......... G11B 27/3027 |
| 2008/0080842 | A1  | 4/2008 | Katsuo |
| 2009/0082888 | A1* | 3/2009 | Johansen ............ H04L 65/1101 |
|              |     |        | 700/94 |

(Continued)

FOREIGN PATENT DOCUMENTS

| EP | 1130594 A1 | 9/2001 |
| EP | 1906406 A1 | 4/2008 |
| JP | 5856436 B2 | 2/2016 |

OTHER PUBLICATIONS

Article entitled "EBU Metadata for News Exchange IPTC NewsML-G2", by Evain et al., dated May 20, 2008 (Year: 2008).*

(Continued)

*Primary Examiner* — Mahesh H Dwivedi
(74) *Attorney, Agent, or Firm* — Canon U.S.A., Inc. IP Division

(57) ABSTRACT

A recording apparatus to record, to a recording medium, a moving image file including video data and an additional information file, which is a file of additional information of the video data; and a control unit configured to perform control to record identification information for identifying category information of the additional information file or a data structure of the additional information file on the recording medium as a file other than the additional information file.

7 Claims, 23 Drawing Sheets

(56) References Cited

U.S. PATENT DOCUMENTS

| | | | |
|---|---|---|---|
| 2009/0094520 A1* | 4/2009 | Kulas | G06F 16/7867 |
| | | | 707/999.102 |
| 2013/0117309 A1* | 5/2013 | Klein, Jr. | G06F 16/639 |
| | | | 707/771 |
| 2020/0210753 A1* | 7/2020 | Sarubin | G06F 18/214 |

OTHER PUBLICATIONS

Article entitled "Ubuntu 18.04 unable to play video and audio files", by Vyas, dated Feb. 20, 2021 (Year: 2021).*

Article entitled "Recover Legacy Media Using Kyno", by Larry, dated Nov. 18, 2020 (Year: 2020).*

* cited by examiner

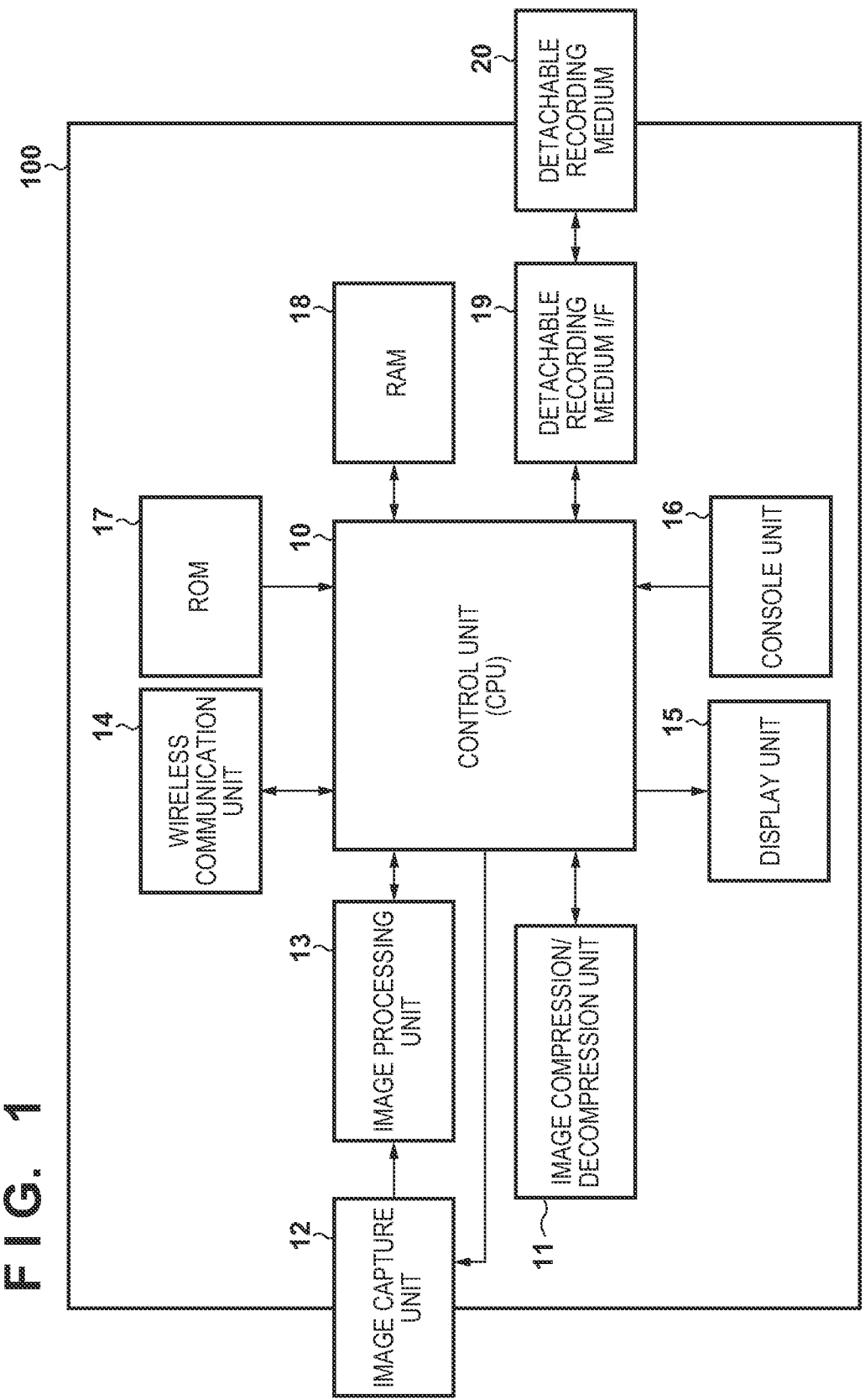

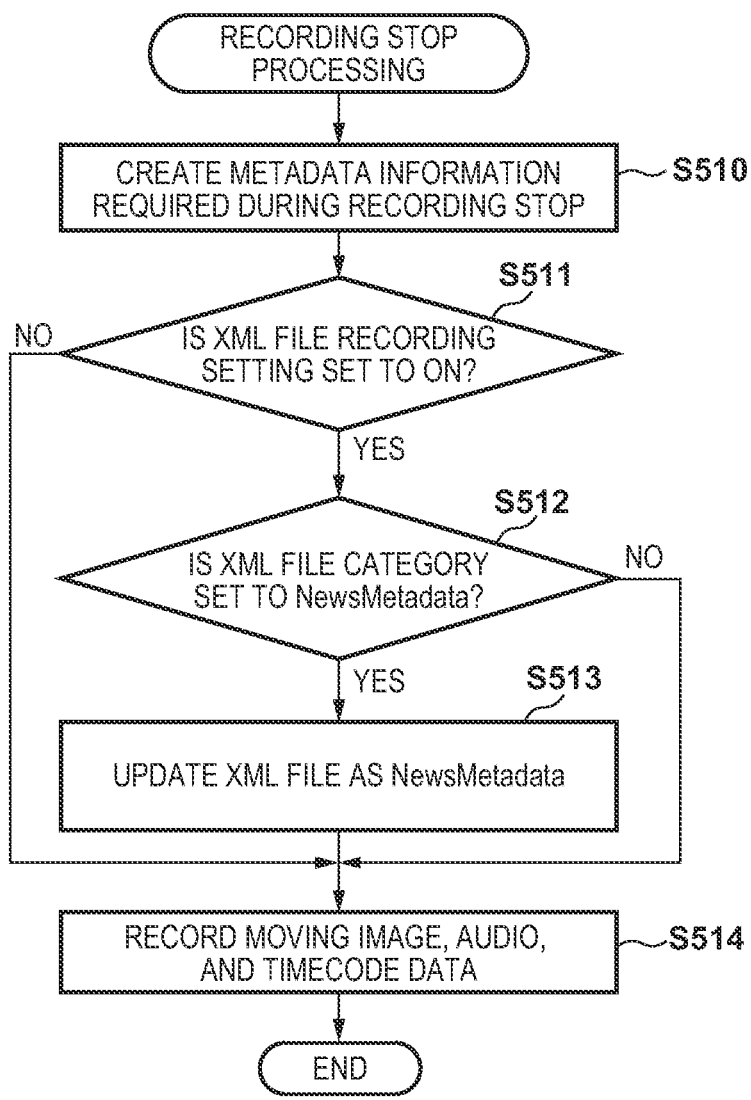

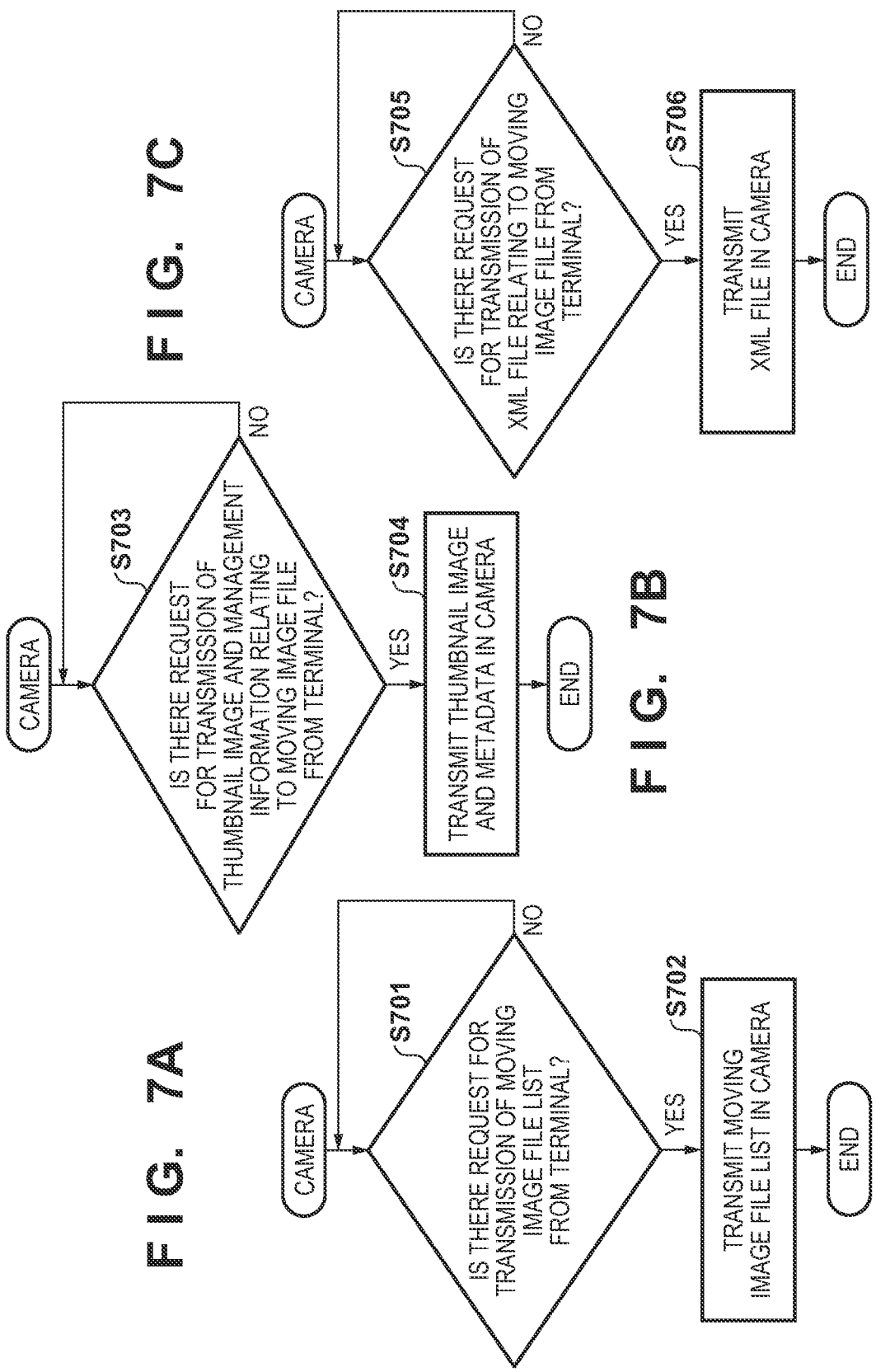

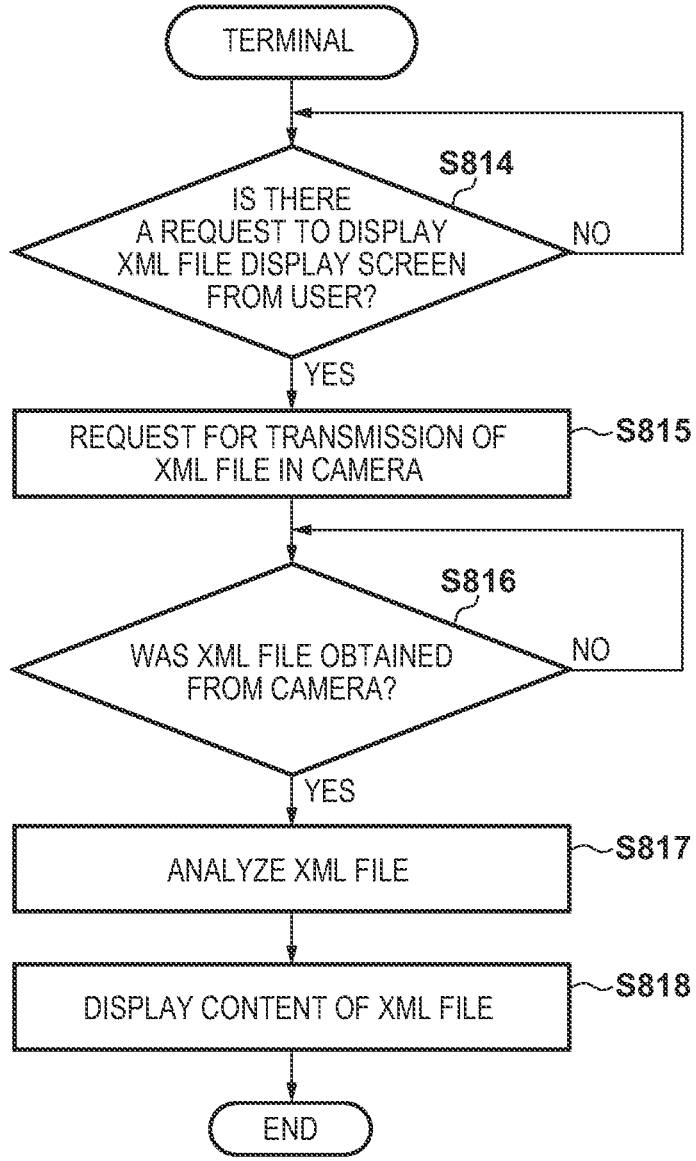

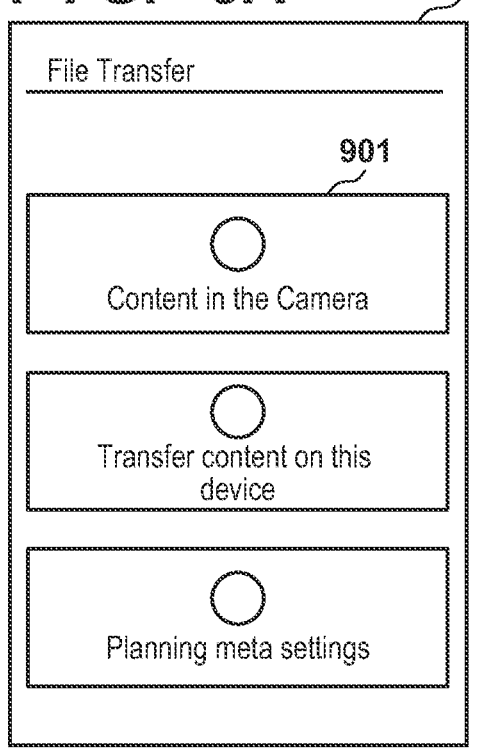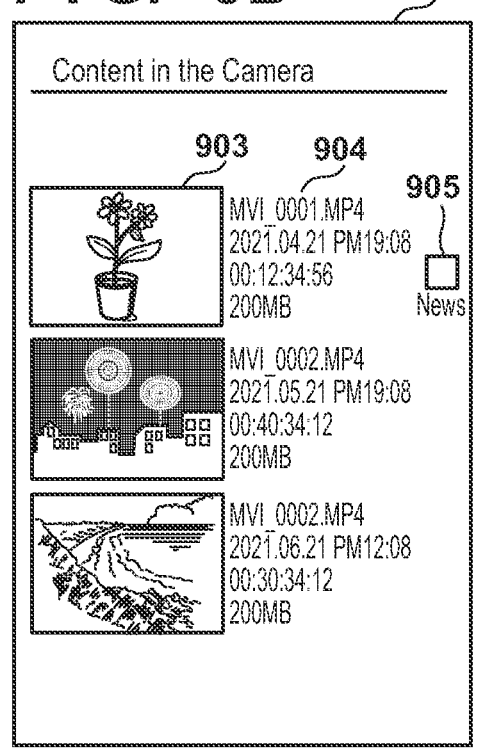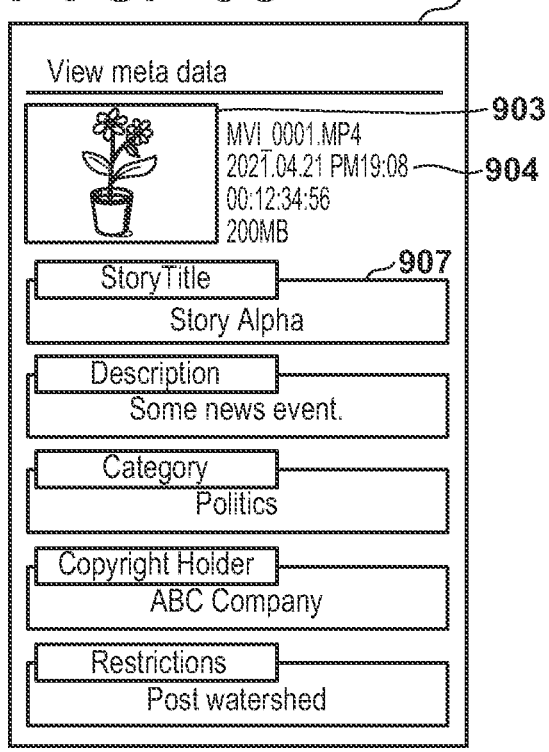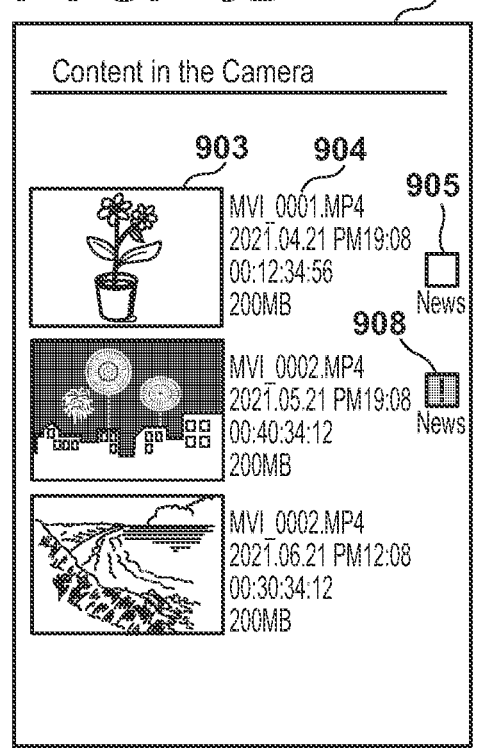

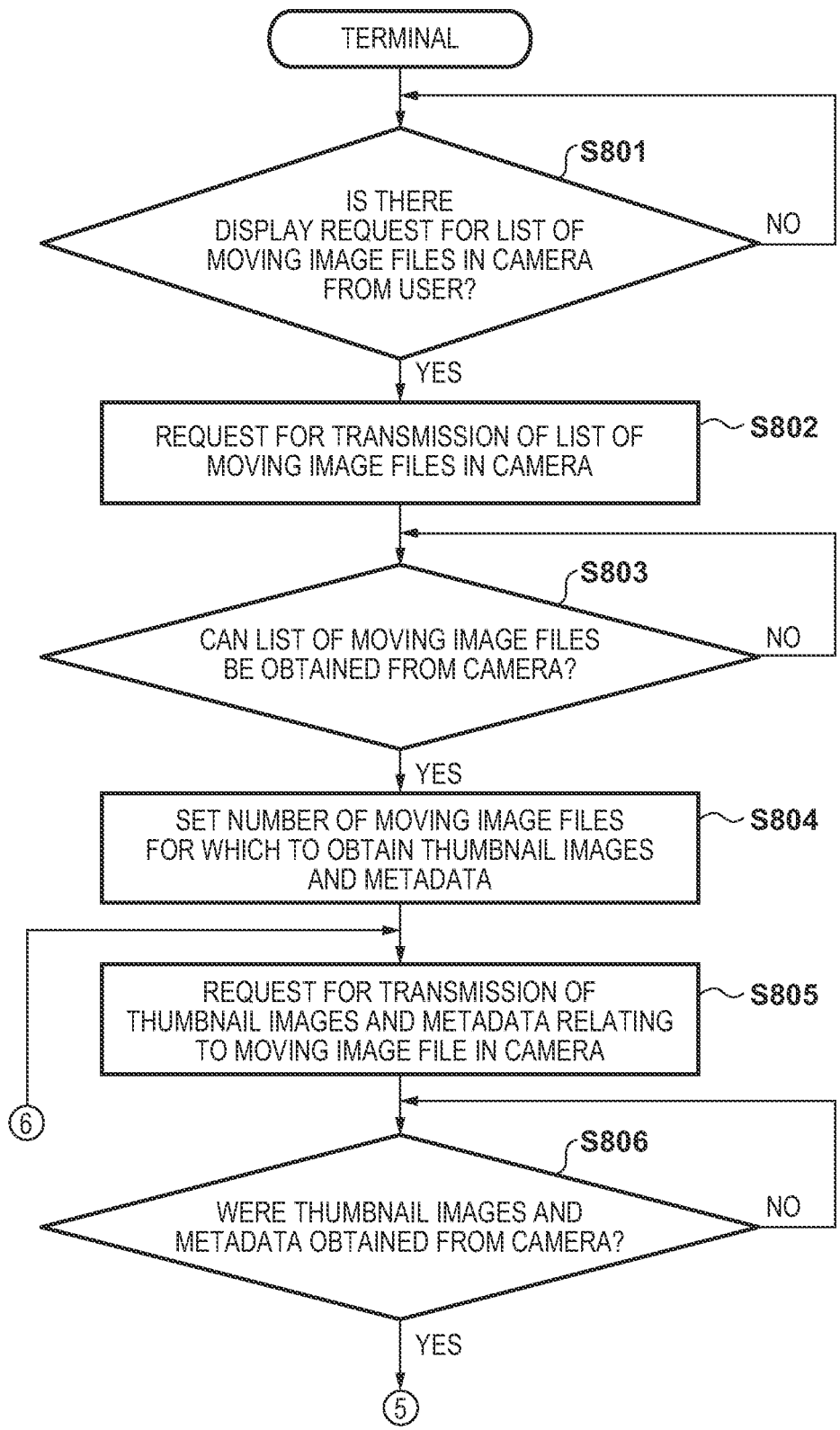

FIG. 16A

```xml
<?xml version="1.0" encoding="UTF-8"?>
<packageItem standard="NewsML-G2" standardversion="2.29" conformance="power" xml:lang="en-GB">
    <rightsInfo>
        <copyrightHolder>
            <name>ABC company</name>
        </copyrightHolder>
        <organisationDetails>
            <contactInfo>
                <phone>xxxxxxxxxxxx</phone>         ⎫
            </contactInfo>                           ⎬ 1601
        </organisationDetails>                       ⎭
    </rightsInfo>
    <itemMeta>
        <generator>planning system A</generator>
    </itemMeta>
</packageItem>

<planningItem standard="NewsML-G2" standardversion="2.29" conformance="power" xml:lang="en-GB">
    <headline>story alpha</headline>
    <subject>politics</subject>
    <description>Some news event.</description>
</planningItem>
```

FIG. 16B

```xml
<?xml version="1.0" encoding="UTF-8"?>
<packageItem standard="NewsML-G2" standardversion="2.29" conformance="power" xml:lang="en-GB">
    <rightsInfo>
        <copyrightHolder>
            <name>ABC company</name>
        </copyrightHolder>
    </rightsInfo>
    <itemMeta>
        <versionCreated>CCYY/MM/DD</versionCreated>   ⎫
        <firstCreated>CCYY/MM/DD/</firstCreated>      ⎬ 1602
        <generator>planning system A</generator>      ⎭
    </itemMeta>
</packageItem>

<planningItem standard="NewsML-G2" standardversion="2.29" conformance="power" xml:lang="en-GB">
    <contentMeta>                                     ⎫
        <creator>                                     ⎪
            <name>abcdefg</name>                      ⎬ 1603
        </creator>                                    ⎪
    </contentMeta>                                    ⎭
    <headline>story alpha</headline>
    <subject>politics</subject>
    <description>Some news event.</description>
</planningItem>
```

FIG. 17A

| NODE NAME | PARENT NODE NAME | HIERARCHICAL STRUCTURE | PRESENCE OR ABSENCE OF ELEMENT |
|---|---|---|---|
| packageItem | — | 1 | ABSENT |
| rightsInfo | packageItem | 2 | ABSENT |
| copyrightHolder | rightsInfo | 3 | ABSENT |
| name | copyrightHolder | 4 | PRESENT |
| organisationDetails | rightsInfo | 3 | ABSENT |
| contactInfo | organisationDetails | 4 | ABSENT |
| phone | contactInfo | 5 | PRESENT |
| itemMeta | packageItem | 2 | ABSENT |
| generator | itemMeta | 3 | PRESENT |
| planningItem | — | 1 | ABSENT |
| headline | planningItem | 2 | PRESENT |
| subject | planningItem | 2 | PRESENT |
| description | planningItem | 2 | PRESENT |

FIG. 17B

| NODE NAME | PARENT NODE NAME | HIERARCHICAL STRUCTURE | PRESENCE OR ABSENCE OF ELEMENT |
|---|---|---|---|
| packageItem | — | 1 | ABSENT |
| rightsInfo | packageItem | 2 | ABSENT |
| copyrightHolder | rightsInfo | 3 | ABSENT |
| name | copyrightHolder | 4 | PRESENT |
| itemMeta | packageItem | 2 | ABSENT |
| versionCreated | itemMeta | 3 | PRESENT |
| firstCreated | itemMeta | 3 | PRESENT |
| generator | itemMeta | 3 | PRESENT |
| planningItem | — | 1 | ABSENT |
| contentMeta | planningItem | 2 | ABSENT |
| creator | contentMeta | 3 | ABSENT |
| name | creator | 4 | PRESENT |
| headline | planningItem | 2 | PRESENT |
| subject | planningItem | 2 | PRESENT |
| description | planningItem | 2 | PRESENT |

RECORDING APPARATUS, METHOD OF CONTROLLING SAME, EXTERNAL APPARATUS, AND STORAGE MEDIUM

BACKGROUND OF THE DISCLOSURE

Field of the Disclosure

The present disclosure relates to technology for recording a moving image file and an additional information file associated with the moving image file on a recording medium.

Description of the Related Art

The recent rise of social networking services (SNS), such as Twitter and the like, has brought with it a demand on broadcasting stations, news agencies, and the like at the news scene to communicate accurate information faster than previously. From this, producing highly up-to-date news quickly and simply has been achieved by using video processing apparatuses, such as digital still cameras, digital video cameras, and the like, and using not only moving image files, but also additional information files including various pieces of metadata relating to the moving image files.

For example, a captured moving image can be recorded together with metadata, such as the moving image format, recording length, and the like. Also, news report information, such as the title and place of coverage can be written into the additional information file when communication is performed from a portable terminal to a digital video camera. The additional information file, for example, is used as information for making a desired moving image file easier to search for in a moving image file server. At this time, by viewing the various pieces of metadata in the moving image files, the format and recording length can be found.

In the technology described in Japanese Patent No. 5856436, when a user enters content in the additional information file associated with a moving image from a communication device or the like, it is prevented from being recorded associated with the wrong target moving image file.

However, with the technology described in Japanese Patent No. 5856436 described above, the category of the additional information file associated with the moving image file captured by an image capture apparatus and whether or not there is an additional information file are not easily determined from an external editing device. To determine this, the additional information file needs to be obtained and analyzed. Thus, there is a possibility of the external editing device being unable to perform, on the moving image file, content editing and the like of the additional information file as desired by the user.

SUMMARY OF TI-IE DISCLOSURE

The present disclosure is made in light of the issues described above and is directed at providing an image capture apparatus capable of easily determining the category or identification information of an additional information file associated with a captured moving image file.

According to a first aspect of the present disclosure, there is provided a recording apparatus comprising: at least one processor or circuit configured to function as: a recording unit configured to record, to a recording medium, a moving image file including video data and an additional information file, which is a file of additional information of the video data; and a control unit configured to perform control to record identification information for identifying category information of the additional information file or a data structure of the additional information file on the recording medium as a file other than the additional information file.

According to a second aspect of the present disclosure, there is provided an external apparatus comprising: at least one processor or circuit configured to function as: a communicating unit configured to communicate with the recording apparatus described above, wherein the external apparatus receives and displays the category information of the additional information file.

According to a third aspect of the present disclosure, there is provided a method of controlling a recording apparatus provided with a recording unit configured to record, to a recording medium, a moving image file including video data and an additional information file, which is a file of additional information of the video data comprising: performing control to record identification information for identifying category information of the additional information file or a data structure of the additional information file on the recording medium as a file other than the additional information file.

According to a fourth aspect of the present disclosure, there is provided a non-transitory computer-readable storage medium storing a program for causing a computer to execute a method of controlling a recording apparatus provided with a recording unit configured to record, to a recording medium, a moving image file including video data and an additional information file, which is a file of additional information of the video data, the method comprising: performing control to record identification information for identifying category information of the additional information file or a data structure of the additional information file on the recording medium as a file other than the additional information file.

Further features of the present disclosure will become apparent from the following description of exemplary embodiments with reference to the attached drawings.

BRIEF DESCRIPTION OF THE DRAWINGS

FIG. 1 is a diagram illustrating the configuration of a digital video camera, which is an image capture apparatus according to a first embodiment of the present disclosure.

FIG. 5B is a flowchart illustrating the recording stop processing of the digital video camera according to the first embodiment.

FIG. 7A is a flowchart illustrating the operations in a case where the digital video camera according to the first embodiment receives a request for transmission of a moving image file list.

FIG. 7B is a flowchart illustrating the operations in a case where the digital video camera according to the first embodiment receives a request for transmission of a thumbnail image and metadata.

FIG. 7C is a flowchart illustrating the operations in a case where the digital video camera according to the first embodiment receives a request for transmission of an XML file.

FIGS. 8A-1 and 8A-2 are flowcharts illustrating the operation of the portable terminal according to the first embodiment sending a request for transmission of a moving image file list to the digital video camera.

FIG. 8B is a flowchart illustrating the operation of the portable terminal according to the first embodiment sending a request for transmission of an XML file to the digital video camera.

FIG. 9A is a diagram illustrating a selection screen on the portable terminal according to the first embodiment.

FIG. 9B is a diagram illustrating a screen displaying a moving image file list on the portable terminal according to the first embodiment.

FIG. 9C is a diagram illustrating a screen displaying an XML file on the portable terminal according to the first embodiment.

FIG. 9D is a diagram illustrating a screen displaying a moving image file list on the portable terminal according to the first embodiment.

FIGS. 15A and 15B are flowcharts illustrating the operation of displaying a moving image file list on the portable terminal according to the third embodiment.

FIG. 16A is a diagram illustrating an example of the contents of the XML file according to the third embodiment.

FIG. 16B is a diagram illustrating an example of the contents of the XML file according to the third embodiment.

FIG. 17A is a node information table used in analyzing the XML file according to the third embodiment.

FIG. 17B is a node information table used in analyzing the XML file according to the third embodiment.

DESCRIPTION OF THE EMBODIMENTS

Figure 2:
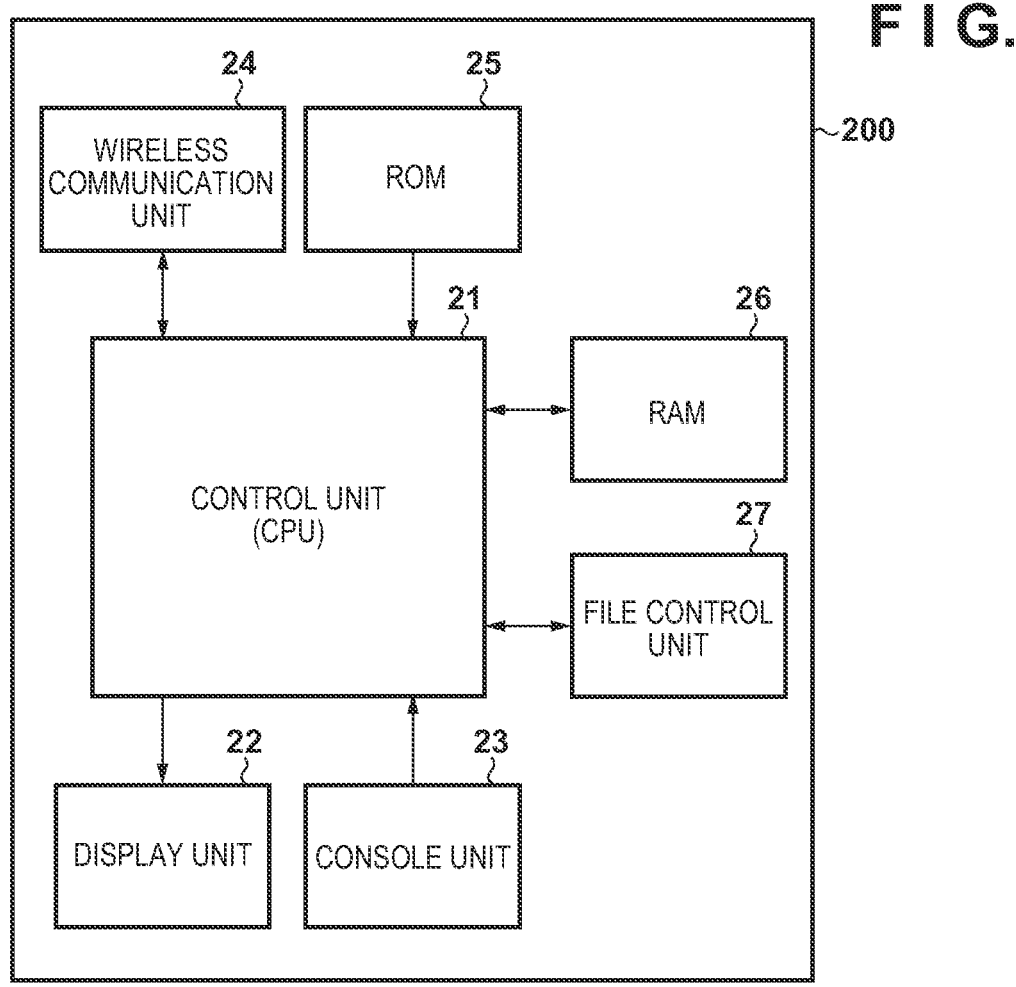
FIG. 2 is a block diagram illustrating the configuration of a portable terminal according to the first embodiment.

Hereinafter, embodiments will be described in detail with reference to the attached drawings. Note, the following embodiments are not intended to limit the scope of the present disclosure. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Figures 1, 8A:
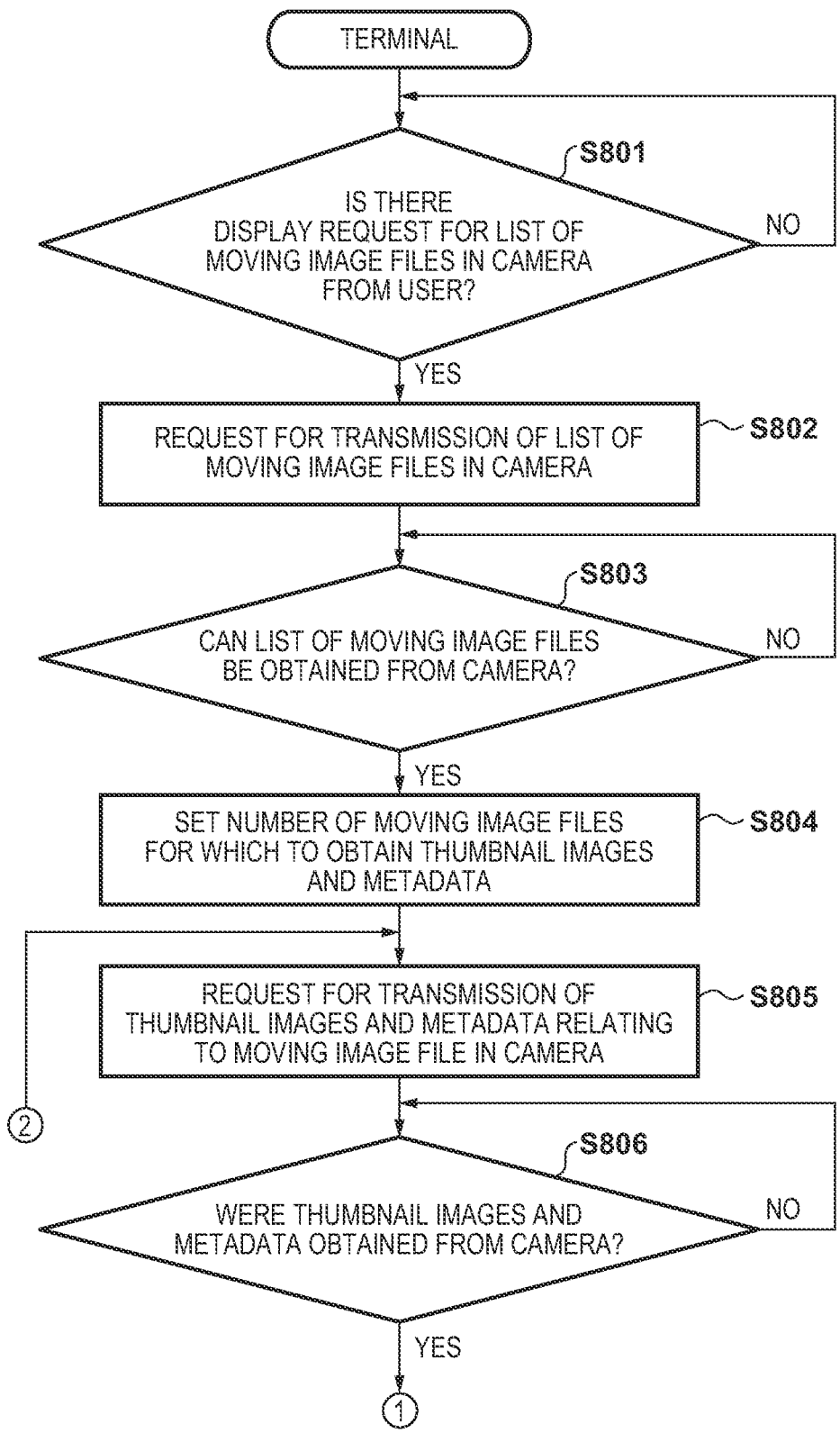
Figures 2, 8A:
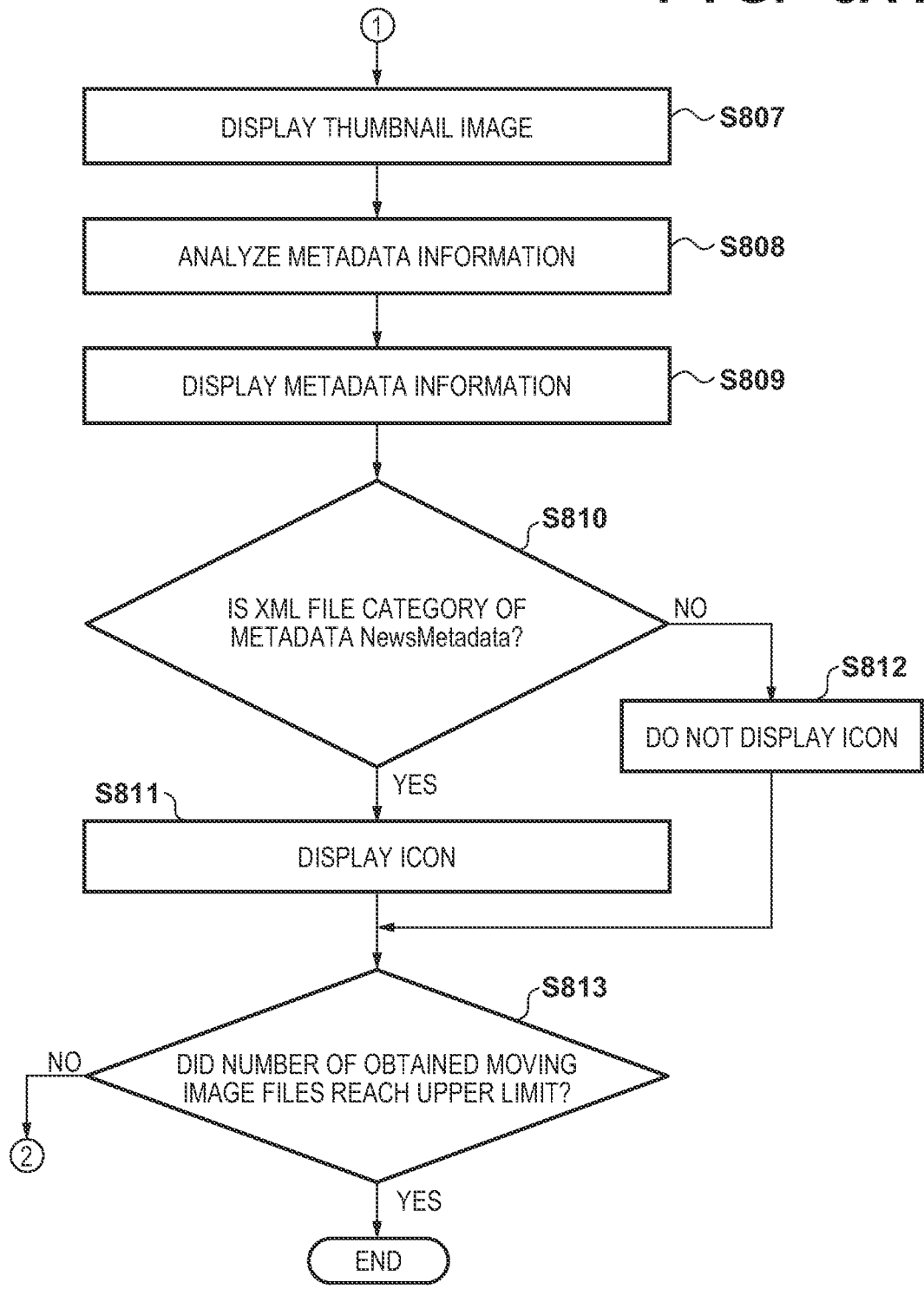

FIG. 1 is a diagram illustrating the configuration of a digital video camera 101) (camcorder), which is an image capture apparatus according to the first embodiment of the present disclosure. Also, FIG. 2 is a diagram illustrating the configuration of a portable terminal 200, which is an editing apparatus according to the first embodiment of the present disclosure.

As illustrated in FIG. 1, the digital video camera 100 is provided with a control unit 10, an image compression/decompression unit 11, an image capture unit 12, an image processing unit 13, a wireless communication unit 14, a display unit 15, a console unit 16, ROM 17, RAM 18, a recording medium I/F 19, and a detachable recording medium 20. The configuration units are connected to the control unit 10, and the control unit 10 and the configuration units send data back and forth between one another.

The control unit 10 is a system control unit that controls the entire system of the digital video camera 100. By loading a program on the RAM 18 recorded on the ROM 17 and executing the program, the control unit 10 controls the configuration units and executes the operations of the flowchart described below. The control unit 10 also controls recording to the recording medium 20 and controls displaying on the display unit 15.

The ROM 17 is a non-volatile recording medium that stores the program executed by the control unit 10. The RAM 18 is a volatile recording medium used as the working memory of the control unit 10. Also, the RAM 18 is used as RAM in a case where compression processing or decompression processing by the image compression/decompression unit 11 is performed on image data captured by the image capture unit 12 and subject to image processing by the image processing unit 13 or image data read out from the detachable recording medium 20. Also, the RAM 18 is used as VRAM for temporary storage when there is a display on the display unit 15. Furthermore, the RAM 18 is used as a storage unit for temporarily storing a captured image and additional information associated together and recorded with the image. The additional information is able be received from the wireless communication unit 21 of the portable terminal 200. In the present embodiment described herein, the additional information is an Extensible Markup Language (XML) file of a markup language. However, as long as the information indicates the additional information, an XML file does not have to be used.

The digital video camera 100 can be installed with the recording medium 20, such as an SD card or the like, for recording image data. For this reason, the recording medium interface (I/F) 19 is provided. The recording medium 19 includes a slot into which a detachable recording medium, such as a memory card or the like, can be inserted. As illustrated in FIG. 1, the detachable recording medium 20 is installed in the recording medium I/F 19. The digital video camera 100 described herein has a configuration in which age data is recorded on a detachable recording medium 20.

However, a configuration may be used in which image data is recorded on a memory built into the digital video camera 100 unable to be detached.

The image processing unit 13 executes predetermined pixel interpolation processing, resize processing, and color conversion processing on image data captured by the image capture unit 12. Also, the image processing unit 13 executes predetermined calculation processing using the captured image data, and the control unit 10 performs various types of control (exposure control, auto white balance control, and the like) relating to image capture by the image capture unit 12 on the basis of the obtained calculation result.

The image compression/decompression unit 11 executes processing to compress the image data the image processing unit 13 executed image processing on and processing to decompress the image data read out from the detachable recording medium 20.

The image capture unit 12 includes an imaging lens (including a zoom lens and focus lens) and an image sensor and captures an image of a subject on the basis of control by the control unit 10 and obtains image data, such as still image data and moving image data.

The display unit 15 displays various set states, images captured by the image capture unit 12, images read out from the detachable recording medium 20 and reproduced, and the like on the basis of control by the control unit 10. The configuration used may be a display in a near-eye viewfinder, a vari-angle liquid crystal monitor, or the like.

The console unit 16 includes a power supply switch for turning on and off the power supply of the digital video camera 100, a start image capture button, a mode switch button for switching between operation modes, such as a camera mode (image capture mode) and a playback mode, and the like and receives operations from the user. Note that in a case where the console unit 16 includes a touch panel, the control unit 10 is capable of detecting the following operations on the touch panel.

- A touch on the touch panel by a finger or stylus pen (hereinafter, referred to as a touch down).
- A state in which the touch panel is being touched by a finger or stylus pen (hereinafter, referred to as a touch on).
- A finger or stylus pen being moved along the touch panel while touching the touch panel (hereinafter, referred to as a move).
- A finger or stylus pen being moved off the touch panel (hereinafter, referred to as a touch up).
- A state of nothing touching the touch panel (referred to as touch off below).

These operations and positional coordinates where the finger or stylus pen are touching the touch panel are communicated to the control unit 10, and the control unit 10 determines what operation has been performed on the touch panel on the basis of the communicated information. Regarding move, the movement direction of the finger or stylus pen moving on the touch panel can be determined for each vertical component and horizontal component on the touch panel on the basis of changes in the positional coordinates.

Also, in a case where there is a touch down on the touch panel, then a certain move, and then a touch up, this is considered to be a stroke. Quick stroke operations are referred to as a flick. A flick is an operation where a finger, while touching the touch panel, is quickly moved a certain distance and then released. In other words, a flick is a quick tracing operation in which a finger is flicked along the touch panel. In a case where a move of a predetermined distance or greater at a predetermined speed or greater is detected and then a touch up is detected, a flick may be determined to have been performed. Also, in a case where a move of a predetermined distance or greater but at less than a predetermined speed is detected, a drag is determined to have been performed. For the touch panel, various types of touch panels may be used, such as a resistive film type, an electrostatic capacitance type, a surface acoustic wave type, an infrared type, an electromagnetic induction type, an image recognition type, and an optical sensor type.

The wireless communication unit 14 transmits and receives data to and from an external device, such as an external camera or personal computer, via wireless communication on the basis of control by the control unit 10. The wireless communication unit 14 transmits out setting information and operation information of the digital video camera 100 and receives commands for operating the digital video camera 100, image data, additional information to be recorded, and the like. The data able to be transmitted and received include digital image data, analog video signals, additional information, and the like.

FIG. 2 is a block diagram illustrating the configuration of the portable terminal 200, which is an external apparatus, according to the first embodiment.

As illustrated in FIG. 2, the portable terminal 200 is provided with a control unit 21, a display unit 22, a console unit 23, the wireless communication unit 24, ROM 25, RAM 26, a file control unit 27. The configuration units are connected to the control unit 21, and the control unit 21 and the configuration units send data back and forth between one another.

The control unit 21 is a system control unit that controls the entire system of the portable terminal 200. By loading a program on the RAM 26 recorded on the ROM 25 and executing the program, the control unit 21 controls the configuration units and executes the operations of the flowchart described below. The ROM 25 is a non-volatile storage medium that stores the program executed by the control unit 21. The RAM 26 is a volatile storage medium used as the working memory of the control unit 21.

The display unit 22 displays various set states, data (including digital image data, analog video signal, and additional information) received by the wireless communication unit 24, and the like on the basis of control by the control unit 21.

The console unit 23 includes a power supply switch for turning on and off the power supply of the portable terminal 200 and the like and receives operations from the user. Note that, as with the console unit 16, the console unit 23 includes a touch panel.

The wireless communication unit 24 transmits and receives data to and from an external device, such as an external camera or personal computer, via wireless communication on the basis of control by the control unit 21. The wireless communication unit 24 receives setting information and operation information of the digital video camera 100 and transmits, to the digital video camera 100, commands for operating the digital video camera 100, image data, additional information to be recorded, and the like. The data able to be transmitted and received include digital image data, analog video signals, additional information, and the like.

The file control unit 27 is capable of performing control to analyze data, such as a moving image file, additional information, and the like, sent from the wireless communication unit 24, to create a thumbnail image, and the like.

Figure 3A:
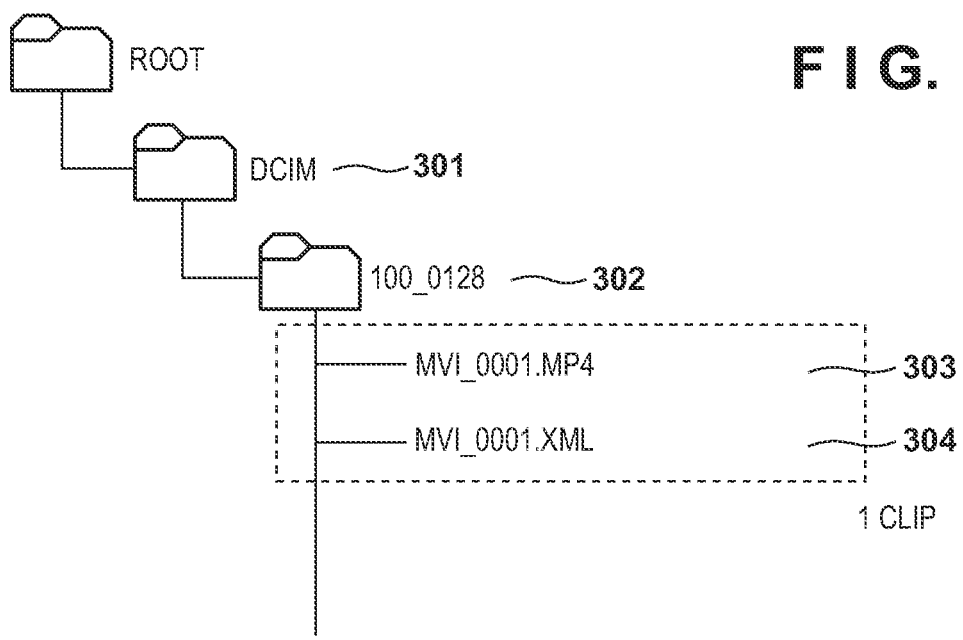
FIG. 3A is a configuration diagram illustrating an MP4 folder according to the first embodiment.

FIG. 3A is a diagram illustrating a folder configuration of the moving image file and the additional information file of the present embodiment.

In the present embodiment described herein, management information, such as compressed video frame, timecode, and the like and audio data are recorded in an MP4 (MPEG-4 Part 14 or ISO/IEC 14496-14:2003) container structure. However, a file format such as Advanced Video Codec High Definition (AVCHD). Material Exchange Format (MXF), and the like may be used. The folder configuration of a MP4 file recorded by the control unit 10 is illustrated in FIG. 3A.

When the detachable recording medium 20 is initialized by the user operating the console unit 16 of the digital video camera 100, a DCIM folder 301 is created. Also, when recording is started by an operation of the console unit 16, a 100_0128 folder 302 is created. The 100 of the folder name represents the directory number, and numbers are assigned in order from 100 to a maximum of 999. The 0128 of the folder name represents the day and month created, in this case indicating it was created on January 28.

Also, a stream file MVI_0001.MP4 (303) and the additional information MVI_0001.XML (304) are recorded. As a plurality of moving image files are recorded, the file names of the MP4 files and the XML files change and increase in number. The timecode and the like required to be set on a frame-by-frame basis are recorded in the MVI_0001.MP4 (303). Also, tag information and the like is recorded in the MVI_0001.XML (304).

Figure 3B:
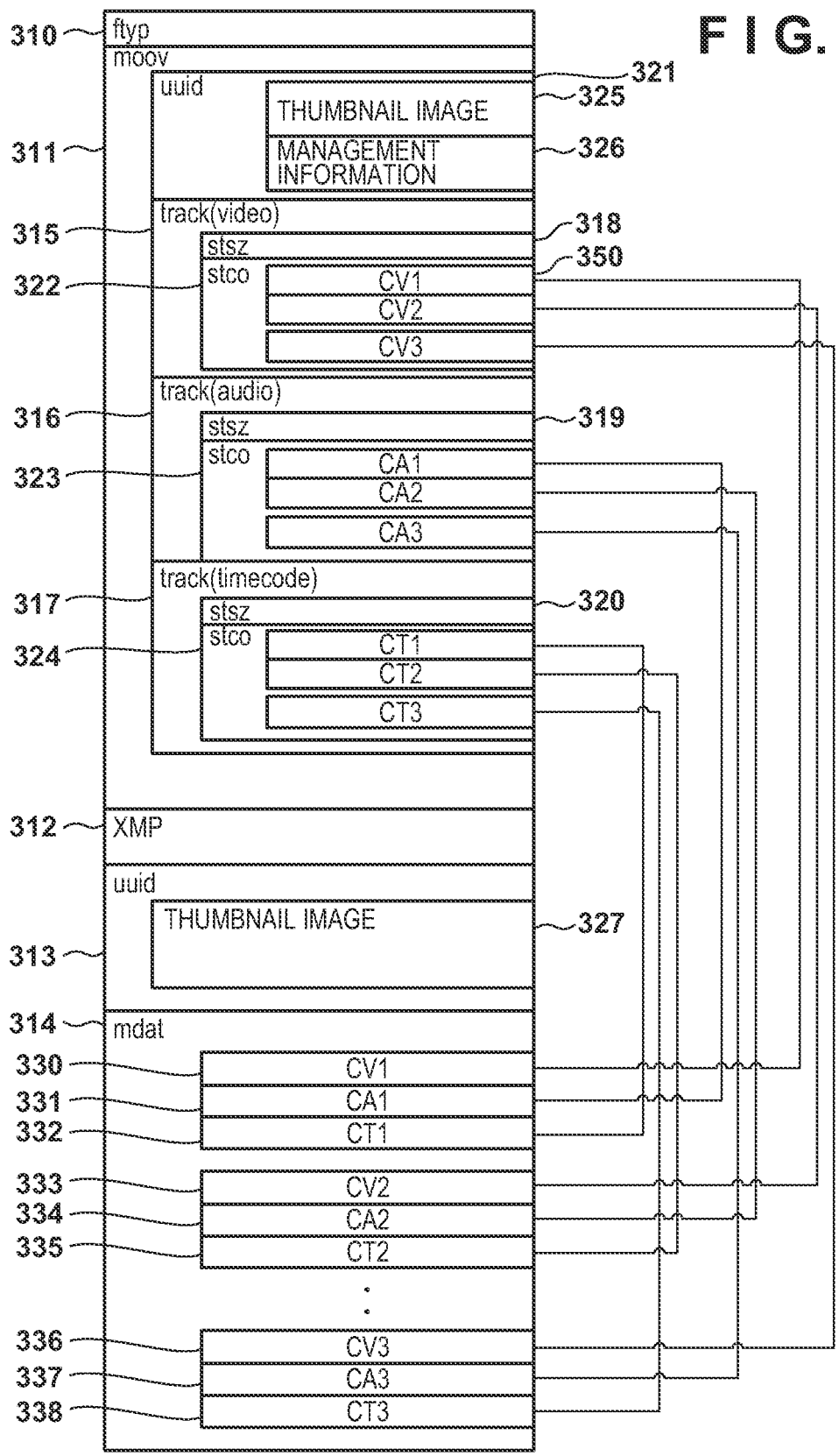
FIG. 3B is a configuration diagram illustrating an MP4 file according to the first embodiment.

FIG. 3B is a diagram illustrating the configuration of a moving image file of the present embodiment.

As illustrated in FIG. 3B, 310 denotes a ftyp box indicating the compatibility of the file format. 311 denotes a moov box, which is a region referred to as a header described in the top region of the moving image file that stores the management information required for playback and a thumbnail image. 312 denotes a box storing the Extensible Metadata Platform (XMP) where discretionary metadata can be set. 313 denotes a uuid box where discretionary information can be added. Here, a preview image 327 is stored. 314 denotes an mdat box storing encoded video data, audio data, timecode data, and frame-by-frame metadata.

Next, the configuration of the moov box 311 will be described.

321 denotes a uuid box where discretionary information can be added and that stores a thumbnail image 325 displayed upon playback and management information 326 used upon playback. 315 to 317 denote track boxes which are boxes storing management information relating to video data, audio data, and timecode data. 318 to 320 denote stsz boxes which stores the data size for each encoding unit of the video data, the audio data, the timecode data, and the frame-by-frame metadata. 322 to 324 denote stco boxes stored in the track boxes. The stco boxes store information indicating the storage position in an mdat 314 of the video data, the audio data, the timecode data, and the frame-by-frame metadata. Each piece of data is stored in the mdat box 314 in a unit called chunks configured by one or more encoding units.

Next, the configuration of the mdat box 314 will be described.

330 to 338 denote the video data, the audio data, the timecode data, and the frame-by-frame metadata stored in the mdat box 314. Each piece of data can be accessed in chunks via the value described in the stco box. For example, 330 (CV1) can be traced to from 350 of stco box 322.

Figure 3C:
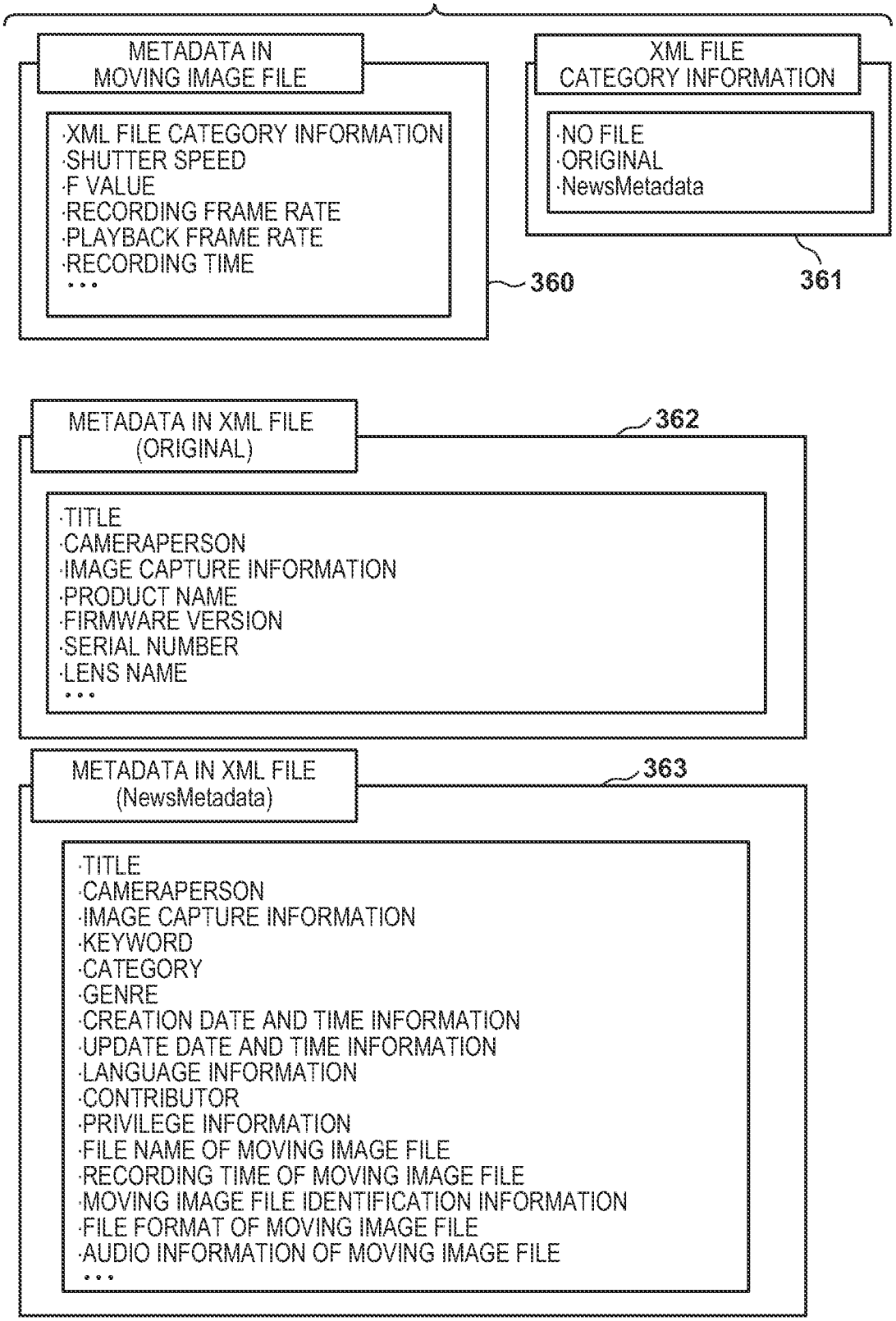
FIG. 3C is a configuration diagram illustrating a moving image file and metadata in an XML file according to the first embodiment.

FIG. 3C is a diagram illustrating the metadata contents of the moving image file and the additional information file of the present embodiment.

360 denotes contents of the metadata in the moving image file, and these are stored in the management information 326. In the management information 326, information of when the digital video camera 100 captured an image, such as an F value indicating the shutter speed or lens brightness, recording frame rate, playback frame rate, and recording time, is recorded. Also, the XML file, which is the additional information file, is recorded together with the moving image file. In addition, information including the category information of the XML file is also recorded.

361 denotes contents including category information of the XML file described in the contents 360, and these are stored in the management information 326. Recorded in 361 is information indicating whether or not an XML file, is recorded, information indicating that an XML file is the original format having tag information unique to the digital video camera 100, and information indicating that an XML file is News Metadata, which is a standard format standardized for news use.

362 is a diagram illustrating the contents of the metadata in a case where the XML file is recorded in the original format having tag information unique to the digital video camera 100. In 362, the title, cameraperson, image capture information, the product name of the digital video camera 100, firmware version information, serial number, lens name, and the like are recorded.

363 is a diagram illustrating the contents of the metadata in a case where the XML file is recorded in News Metadata, which is a standard format standardized for news use. An example of a standard format standardized for news use includes the NewsML-G2 format standardized by the International Press Telecommunications Council (IPTC). In the content 363 of the metadata, the title, cameraperson, image capture information, keyword, category, genre, date and time information, language information, contributor, privilege information, information relating to the moving image file (file name, recording time, identification information, file format, audio information), and the like are recorded.

Figure 4:
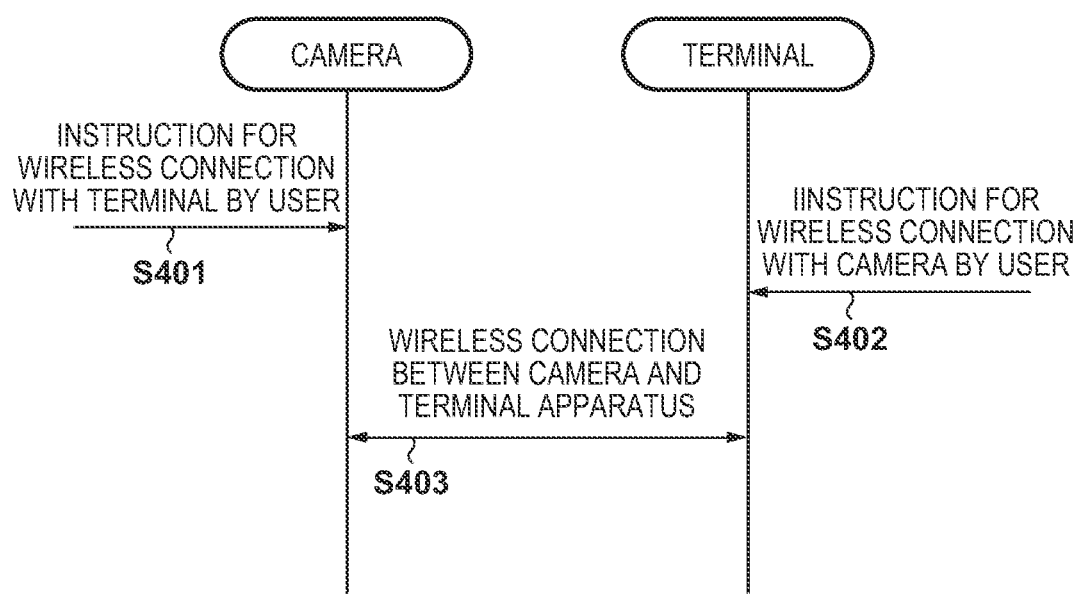
FIG. 4 is a connecting sequence diagram fir the digital video camera and the portable terminal according to the first embodiment.

FIG. 4 is a diagram illustrating the operation sequence when the digital video camera 100 (camcorder) and the portable terminal 200 are connected.

In step S401, when the user operates the console unit 16 of the digital video camera 100, an instruction for wireless connection with the portable terminal 200 is sent, with the control unit 10 sending the instruction to the wireless communication unit 14.

In step S402, when the user operates the console unit 23 of the portable terminal 200, an instruction for wireless connection with the digital video camera 100 is sent, with the control unit 21 sending the instruction to the wireless communication unit 24.

In step S403, the wireless communication unit 14 of the digital video camera 100 and the wireless communication unit 24 of the portable terminal 200 perform a wireless connection between the digital video camera 100 and the portable terminal 200. When a wireless connection is established between the digital video camera 100 and the portable terminal 200, the transmitting and receiving of control commands and setting information, digital image data and analog video signal, and additional information is enabled.

Figure 5A:
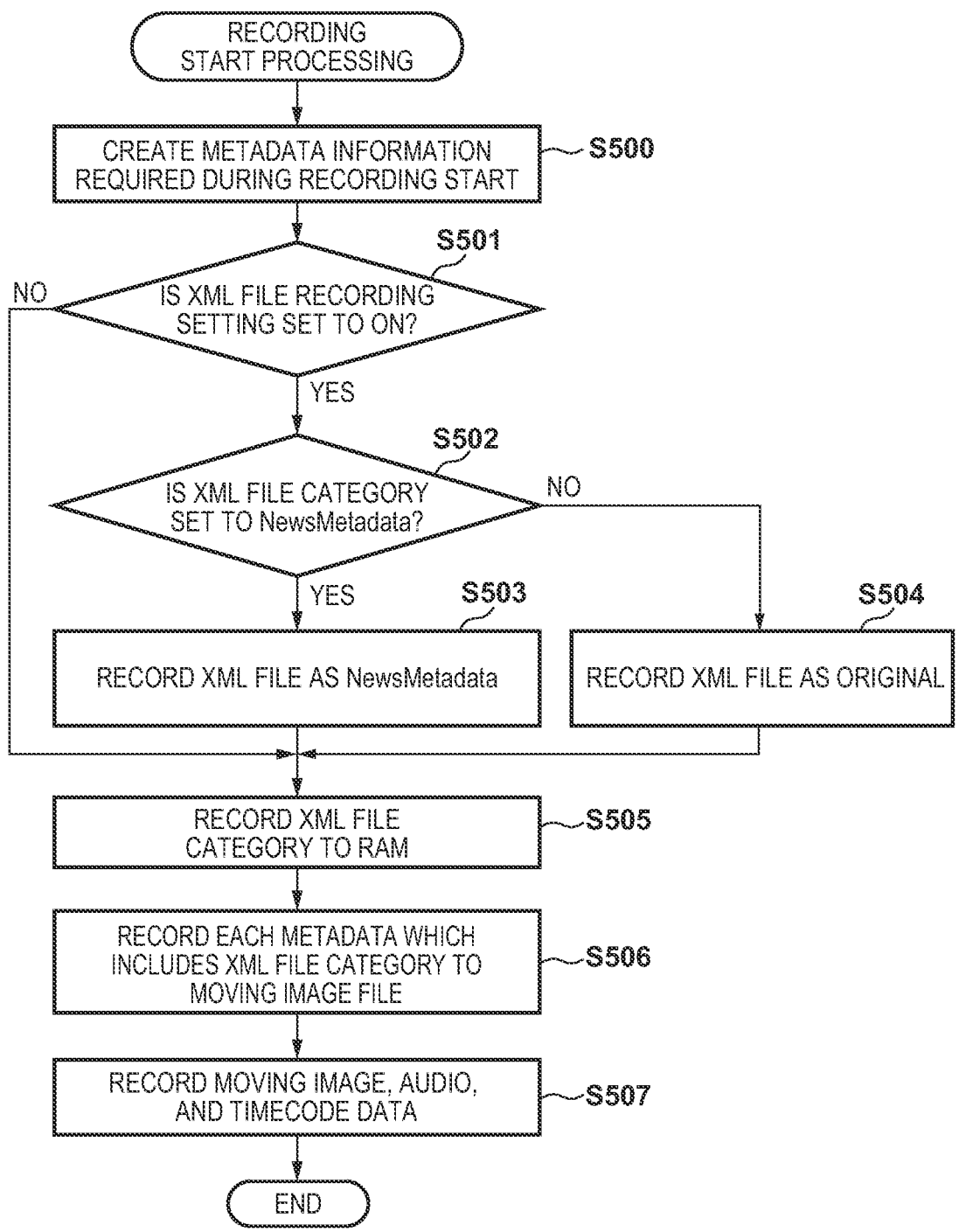
FIG. 5A is a flowchart illustrating the recording start processing of the digital video camera according to the first embodiment.

FIG. 5A is a flowchart illustrating the operations in a case where the user operates the console unit 16 and sends a recording start request to the control unit 10 of the digital video camera 100.

In step S500, the control unit 10 creates the metadata information required to start recording on the detachable recording medium 20 and holds this in the RAM 18.

Figure 6A:
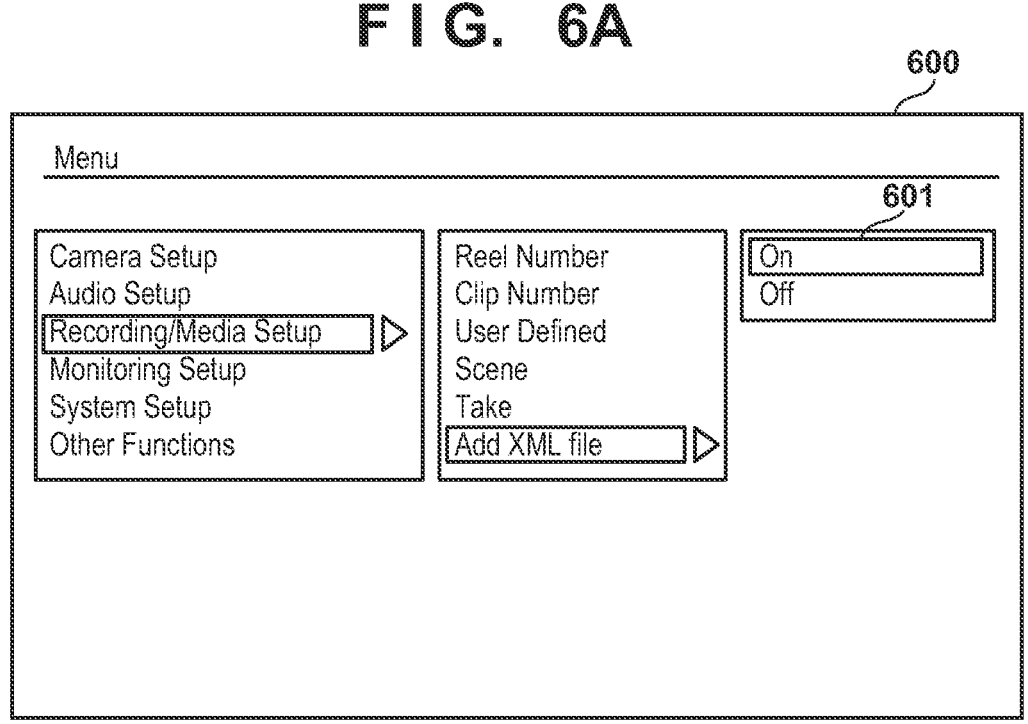
FIG. 6A is a diagram illustrating a menu screen of the digital video camera according to the first embodiment.

In step S501, the control unit 10 determines whether or not the XML file recording setting is set to on. The XML file recording setting can be set to on or off by the user operating the console unit 16. By the user pushing a menu button included on the console unit 16 and opening a menu 600 such as that illustrated in FIG. 6A, an item, for example, On (601), indicating the XML file recording setting can be selected from the menu items. In a case where the XML file recording setting is determined to be on, the control unit 10 proceeds the processing to step S502. Otherwise, the processing proceeds to step S505.

Figure 6B:
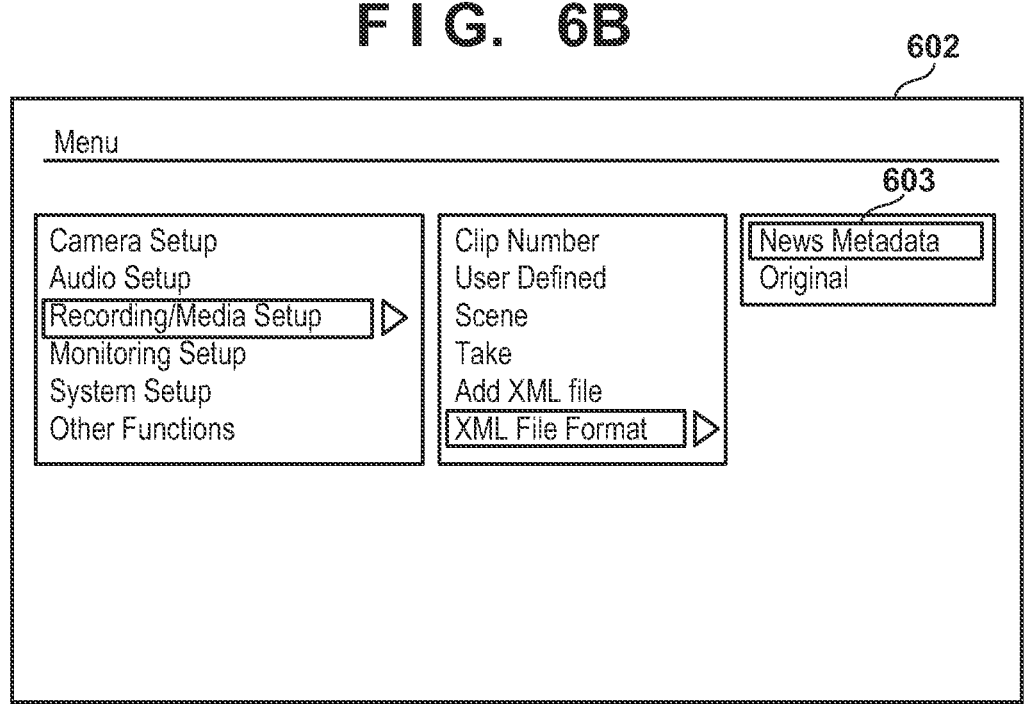
FIG. 6B is a diagram illustrating a menu screen of the digital video camera according to the first embodiment.

In step S502, the control unit 10 determines whether or not the XML file category setting is set to News Metadata. The XML file category setting can be set by the user operating the console unit 16. By the user pushing a menu button included on the console unit 16 and opening a menu 602 such as that illustrated in FIG. 6B, an item, for example, News Metadata (603), indicating the XML file category setting can be selected from the menu items. In a case where the XML file category setting is determined to be News Metadata, the control unit 10 proceeds the processing to step S503. Otherwise, the processing proceeds to step S504.

In step S503, the control unit 10 reads out the metadata information held in the RAM 18 in step S500 and instructs the detachable recording medium 20 to record metadata information. Then, metadata information 363 (see FIG. 3C) is written to the XML file as News Metadata.

In step S504, the control unit 10 reads out the metadata information held in the RAM 18 in step S500 and instructs the detachable recording medium 20 to record metadata information. Then, the metadata information 362 (see FIG. 3C) is written to the XML file as unstandardized original information.

In step S505, the control unit 10 writes the category information of the XML file written in the management information 326 of the moving image file as metadata information to the RAM 18.

In step S506, the control unit 10 reads out the metadata information held in the RAM 18 in step S500 and step S505, converts these to the format of the management information 326 of the moving image file, and issues an instruction for these to be written to the detachable recording medium 20. Then, the metadata information 360 (see FIG. 3C) is written to the detachable recording medium 20 as management information of a moving image file which is a portion of the moving image file.

In step S507, the control unit 10 converts the moving image data, the audio data, and the timecode data held in the RAM 18 to the format of FIG. 3B and issues an instruction for them to be written to the detachable recording medium 20. Then, the moving image data, the audio data, and the timecode data is written to the detachable recording medium 20 as a moving image file.

FIG. 5B is a flowchart illustrating the operations in a case where the user operates the console unit 16 and sends a recording stop request to the control unit 10 of the digital video camera 100.

In step S510, the control unit 10 creates the metadata information required to stop recording on the detachable recording medium 20 and holds this in the RAM 18.

In step S511, the control unit 10 determines whether or not the XML file recording setting is set to on. As described above, the XML file recording setting can be set to on or off by the user operating the console unit 16. In a case where the XML file recording setting is determined to be on, the control unit 10 proceeds the processing to step S512. Otherwise, the processing proceeds to step S514.

In step S512, the control unit 10 determines whether or not the XML file category setting is set to News Metadata. As described above, the XML file category setting can be set by the user operating the console unit 16. In a case where the XML file category setting is determined to be News Metadata, the control unit 10 proceeds the processing to step S513. Otherwise, the processing proceeds to step S514.

In step S513, the control unit 10 uses the recording medium I/F 19 and reads out the XML file written upon the start of recording from the detachable recording medium 20 to the RAM 18. Then, the recording time and update date and time information of the moving image file created in step S510 is updated on the XML file read out to the RAM 18. Furthermore, the control unit 10 uses the recording medium I/F 19 and writes the updated XML file to the detachable recording medium 20 again as an XML In step S514, the control unit 10 converts the moving image data, the audio data, and the timecode data stored in the RAM 18 up until the recording stop request was received to the format of FIG. 3B. Then, the moving image data, the audio data, and the timecode data is written to the detachable recording medium 20 as a moving image file using the recording medium I/F 19, and recording stop processing ends.

FIGS. 7A to 7C are flowcharts illustrating the operations when the digital video camera 100 receives a control request from the portable terminal 200.

FIG. 7A is a flowchart illustrating the operations when the digital video camera 100 receives a request for transmission of a list including the number of moving image files in the digital video camera 100 from the portable terminal 200.

In step S701, the control unit 10 determines whether or not there is a request for transmission of a list including the number of moving image files from an external apparatus via the wireless communication unit 14. In a case where the control unit 10 determines that there is a request for transmission of a list including the number of moving image files, the processing proceeds to step S702. If this is not determined, step S701 is repeated.

In step S702, the control unit 10 writes information relating to the moving image file recorded in the detachable recording medium 20 to the RAM 18 as the list. Information such as the number of moving image files and the like are included in the list. The control unit 10 transmits the list written to the RAM 18 to the outside using the wireless communication unit 14.

FIG. 7B is a flowchart illustrating the operations when the digital video camera 100 receives a request for transmission of a thumbnail image and management information relating to the specified moving image file in the digital video camera 100 from the portable terminal 200.

In step S703, the control unit 10 determines whether or not there is a request for transmission of a thumbnail image and management information relating to a moving image file from an external apparatus via the wireless communication unit 14. In a case where the control unit 10 determines that there is a request for transmission of a thumbnail image and management information relating to a moving image file, the processing proceeds to step S704. If this is not determined, step S703 is repeated.

In step S704, the control unit 10 reads out and analyzes the thumbnail image 325 and the management information 326 of the moving image file recorded in the detachable recording medium 20 relating to the specified moving image file from an external apparatus and loads them on the RAM 18. When the control unit 10 has finished reading out and analyzing the thumbnail image 325 and the management information 326, the control unit 10 uses the wireless communication unit 14 and transmits the thumbnail image 325 and the management information 326 to the outside. The thumbnail image 325 and the management information 326 of the moving image file are recording in a region on the top side of the moving image file, and thus can be read before the entire moving image file is read. For example, by reading out the data of a specific size from the top of the moving image file instead of the entire moving image file, the thumbnail image 325 and the management information 326 can be read out.

FIG. 7C is a flowchart illustrating the operations when the digital video camera 100 receives a request for transmission of an XML file relating to a specified moving image file in the digital video camera 100 from the portable terminal 200.

In step S705, the control unit 10 determines whether or not there is a request for transmission of an XML file relating to a moving image file from an external apparatus via the wireless communication unit 14. In a case where the control unit 10 determines that there is a request for transmission of an XML file relating to a moving image file, the processing proceeds to step S706. If this is not determined, step S705 is repeated.

In step S706, the control unit 10 reads out and analyzes the XML file of the moving image file recorded in the detachable recording medium 20 relating to the specified moving image file from an external apparatus and loads them on the RAM 18. When the control unit 10 has finished reading out and analyzing the XML file, the control unit 10 uses the wireless communication unit 14 and transmits the XML file to the outside.

FIGS. 8A and 8B are flowcharts illustrating the operations when a control request relating to the moving image file or the XML file in the digital video camera 100 is received from the portable terminal 200.

FIGS. 8A-1 and 8A-2 are flowcharts illustrating the operations in a case where a user has requested, via an operation on the portable terminal 200, a list relating to moving image files in the digital video camera 100 to be displayed.

In step S801, in response to a user operation of the console unit 23, the control unit 21 determines whether or not there is a display request for a list of moving image files in the digital video camera 100. In a case where the control unit 21 determines that there is a display request for a list of moving image files, the processing proceeds to step S802. If this is not determined, step S801 is repeated.

In step S802, the control unit 21 sends a request for transmission of a list of moving image files to the digital video camera 100 via the wireless communication unit 24. At this time, the digital video camera 100 performs the operations described using FIG. 7A. Furthermore, when a menu button included on the console unit 23 is operated, the control unit 21 displays a screen 900 as illustrated in FIG. 9A and enables selection of a display of a list of moving image files of the digital video camera 100 from the menu items. In a case where an icon 901 is selected via the console unit 23, the control unit 21 displays a screen where the contents of the moving image file of the digital video camera 100 can be checked.

In step S803, the control unit 21 determines whether or not a list of moving image files has been obtained from the digital video camera 100 via the wireless communication unit 24. In a case where the control unit 21 determines that a list of moving image files has been obtained, the processing proceeds to step S804. If this is not determined, step S803 is repeated.

In step S804, the control unit 21 loads the information obtained via the wireless communication unit 24 on the RAM 26, takes into account the region able to be displayed by the display unit 22, and sets the number of moving image files to obtain the thumbnail image and metadata.

In step S805, the control unit 21 sends a request for transmission of the thumbnail image and metadata in the moving image file to the digital video camera 100 via the wireless communication unit 24. At this time, the digital video camera 100 performs the operations described using FIG. 7B.

In step S806, the control unit 21 determines whether or not the thumbnail image and metadata have been obtained from the digital video camera 100 via the wireless communication unit 24. In a case where the control unit 21 determines that the thumbnail image and metadata have been obtained, the processing proceeds to step S807. If this is not determined, step S806 is repeated.

In step S807, the control unit 21 loads the thumbnail image information obtained via the wireless communication unit 24 on the RAM 26, takes into account the region able to be displayed by the display unit 22, and displays the thumbnail image of the moving image file.

In step S808, the control unit 21 loads the metadata information of the moving image file obtained via the wireless communication unit 24 on the RAM 26 and analyzes the metadata information.

In step S809, the control unit 21 displays a portion of the metadata information of the moving image file loaded on the RAM 26 on the display unit 22.

In step S810, the control unit 21 determines whether or not the category of the XML file in the portion of the metadata information of the moving image file loaded on the RAM 26 is News Metadata. In a case where the category of the XML file is determined to be News Metadata, the control unit 21 proceeds the processing to step S811. If this is not determined, the processing proceeds to step S812.

In step S811, the control unit 21 causes the display unit 22 to display an icon (icon 905) that shows the category of the XML file to be News Metadata.

In step S812, the category of the XML file is not News Metadata, and so the control unit 21 performs control to not cause the display unit 22 to display an icon.

FIG. 9B is a diagram illustrating a state in which a screen 902 displaying content including thumbnail images and a list of metadata of the moving image files of the digital video camera 100 has been opened by an operation of a menu button included on the console unit 23. Reference number 904 denotes a portion of the contents of the metadata information and indicate the file name and date and time information of the moving image file, the recording time, and the moving image file size. Reference number 905 denotes the category information of the XML file associated with the moving image file and in this case indicates that a News Metadata XML file is recorded in a moving image file 903. In the present embodiment, the category of the XML file is displayed as an icon together with the thumbnail image, but may be displayed using a different display item.

In step S813, the control unit 21 determines whether or not the upper limit for the number of moving image files in the list of moving image files stored in the RAM 26 has been reached. In a case where the control unit 21 determines that the upper limit of the number of moving image files has been reached, the processing ends. If this is not determined, the processing returns to step S805.

FIG. 8B is a flowchart illustrating the operations, in the portable terminal 200, in a case where there is a request for information display of the News Metadata associated with the moving image files in the digital video camera 100.

In step S814, in response to an operation of the console unit 23, the control unit 21 determines whether or not there is a display request for the News Metadata associated with the moving image files in the digital video camera 100. In the present embodiment, in a case where there is an operation (touch operation) of the icon 905, it is determined that there is a display request for the News Metadata. In a case where the control unit 21 determines that there is a display request for the News Metadata, the processing proceeds to step S815, if this is not determined, step S814 is repeated.

In step S815, the control unit 21 sends a request for transmission of the News Metadata XML file to the digital video camera 100 via the wireless communication unit 24. At this time, the digital video camera 100 performs the operations described using FIG. 7C.

In step S816, the control unit 21 determines whether or not the News Metadata XML file has been obtained from the digital video camera 100 via the wireless communication unit 24. In a case where the control unit 21 determines that the News Metadata XML file has been obtained, the processing proceeds to step S817. If this is not determined, step S816 is repeated.

In step S817, the control unit 21 uses the file control unit 27 and analyzes the XML file stored in the RAM 26.

In step S818, the control unit 21 causes the display unit 22 to display the contents analyzed by the file control unit 27.

FIG. 9C is a diagram illustrating a state in which a screen 906 displaying the contents of the News Metadata XML file of the digital video camera 100 has been opened by an operation of a menu button included on the console unit 23. An icon 907 represents a portion of the contents of the News Metadata XML file and indicates the title name, description content, category information, copyright information, restriction information, and the like.

As described above, in the first embodiment, the moving image file recorded by the digital video camera 100 and the XML file and metadata information thereof are recorded. Also, the moving image file of the digital video camera 100 is obtained from the portable terminal 200, and the category of the XML file is obtained from the metadata information recorded in the moving image file. Thus, the category of the XML file can be displayed, and the contents of the XML file can also be displayed.

In other words, the category of the XML file can be obtained by referencing the metadata information of the moving image file without analyzing the contents of the XML file. Also, by displaying the category of the XML file on the portable terminal 200 using this information, the category of the XML file associated with the moving image file can be easily checked.

In the present embodiment, a case of displaying an icon only in the case of News Metadata has been described. However, an icon may also be displayed in the case of the original XML file. In a case where an icon of the original XML file is also displayed, the control unit 21 preferably displays different icons depending on the file category so that the different file categories can be distinguished from one another. Also in a case where there is a display request for the XML file due to a user operating the icon of the original, not the News Metadata, as in the case of News Metadata, the control unit 21 preferably obtains the original XML file and displays the contents of the XML file. Displaying an icon of only News Metadata is effective in the case of displaying only items that are used with high frequency. Displaying the icons of all of the XML file categories allows it to be seen whether an XML file is associated with the moving image file. Also, displaying different icons for each file category can be considered advantageous in that it allows all of the category information of the XML files associated with the moving image file to be known. Whether only a News Metadata icon is displayed or whether icons of XML files other than News Metadata are displayed may be set by the user. The user may be able to set this for each file category.

Second Embodiment

In the second embodiment, the configuration of the digital video camera 100 and the configuration of the portable terminal 200, functioning as an editing apparatus, is similar to that in the first embodiment illustrated in FIGS. 1 and 2. In the first embodiment described above, the moving image file is an MP4 file. However, in the second embodiment, the moving image file is an MXF file.

Figure 10A:
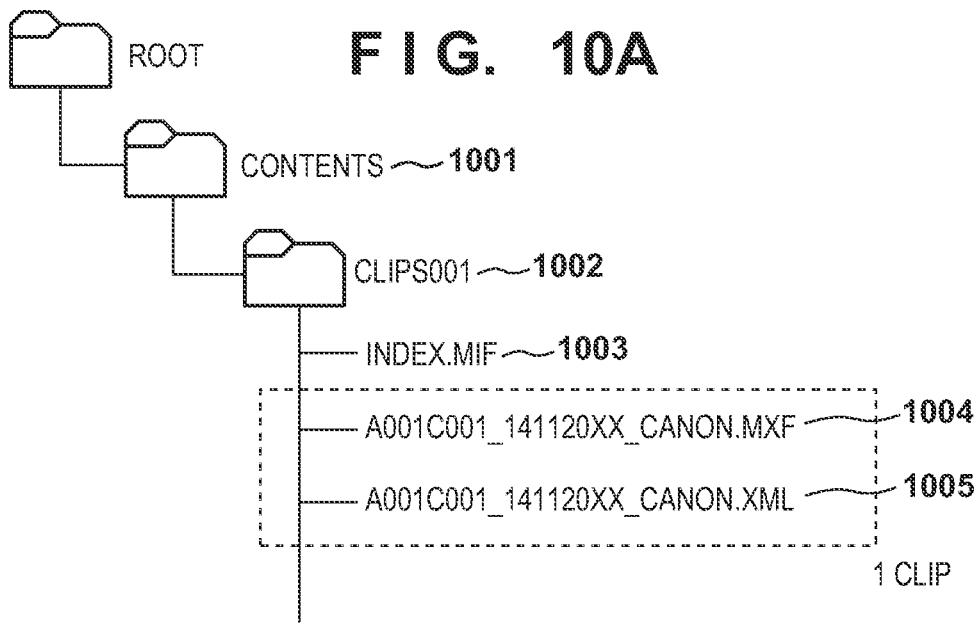
FIG. 10A is a configuration diagram illustrating an XF-AVC folder according to the first embodiment.

FIG. 10A is a diagram illustrating the folder configuration of an MXF file recorded by the control unit 10.

When the detachable recording medium 20 is initialized by the user operating the console unit 16 of the digital video camera 100, a CONTENTS folder 1001 and a CLIPS001 folder 1002 are created. Also, when recording is started by an operation of the console unit 16, a INDEX.MIF (1003) is created. Also, a stream file A001C001_141120XX_CANON.MXF (1004) and additional information A001C001_141120XX_CANON.XML (1005) are recorded.

As a plurality of moving image files are recorded, the file names of the MXF files and the XML files change and increase in number. Also, the INDEX.MIF (1003) is a management file in which the moving image file information are collectively included. Because there is the INDEX.MIF (1003), only one management file needs to be analyzed in a case where the number of moving image files increases, and the inside of each folder per moving image file does not need to be analyzed. This allows the analysis time to be reduced. Also, the timecode and the like required to be set on a frame-by-frame basis are recorded in the A001C001_141120XX_CANON.MXF (1004). Also, tag information and the like is recorded in the A001C001_141120XXCANON.XML (1005).

Figure 10B:
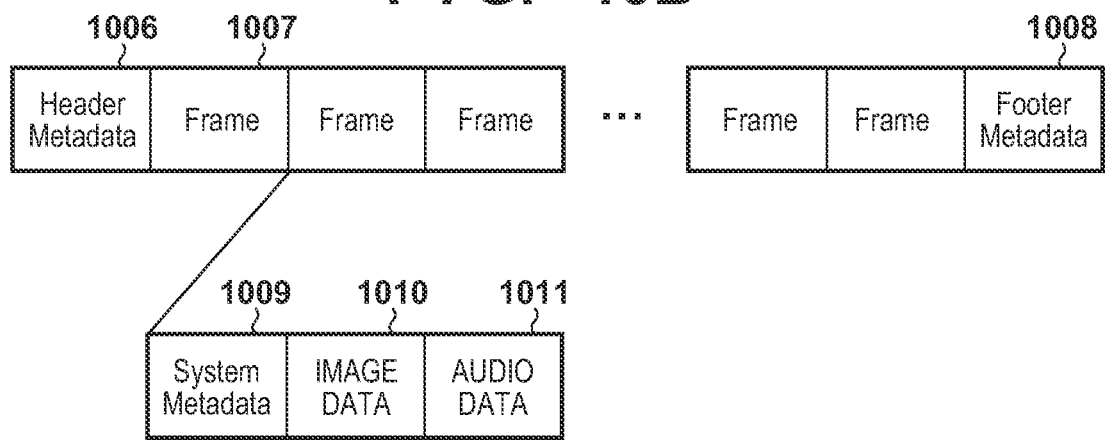
FIG. 10B is a configuration diagram illustrating an XF-AVC file according to the first embodiment.

FIG. 10B is a diagram illustrating the MXF container structure.

A header 1006 indicates the start of the file and is where the metadata information relating to the file is recorded. When image data is recorded, information, such as the recording resolution, frame rate, and the like, is recorded in the region of the header 1006. A frame 1007 (hereinafter, referred to as frame information) indicates the data of each frame and includes metadata information 1009, image data 1010, and audio data 1011 of the frame. A footer 1008 corresponds to information indicating the end of the file. The frame number, with 0 being the starting frame, is recorded in the region of the metadata information 1009 of the frame. As in the first embodiment, the A001C001_141120XX_CANON.XML (1005) is an Extensible Markup Language (XML) file of a markup language.

Figure 10C:
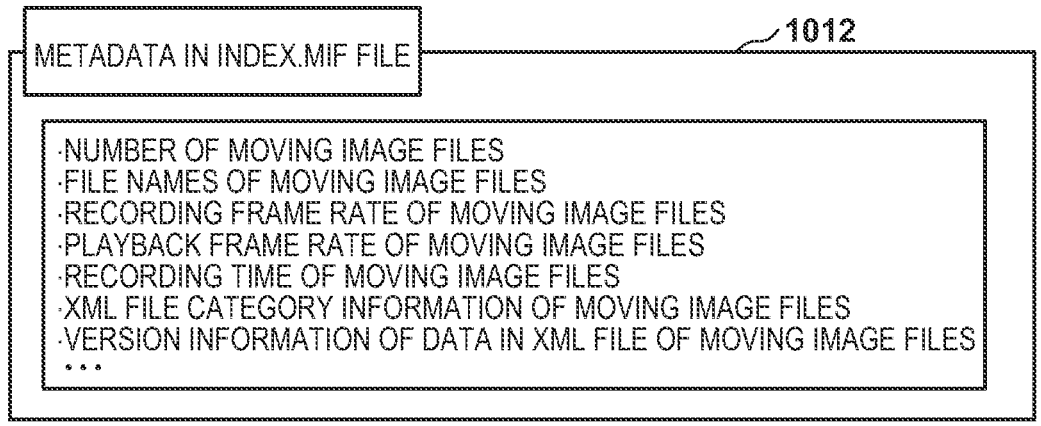
FIG. 10C is a configuration diagram illustrating metadata of a management information file according to the first embodiment.

FIG. 10C is a diagram illustrating the configuration of the INDEX.MIF (1003) recorded by the control unit 10.

Reference number 1012 denotes the contents of the metadata in the INDEX.MIF (1003), and these are stored in the management information file. The management information file includes information relating to the number of moving image files, the file names of the moving image files, recording frame rate, playback frame rate, recording time, XML file category information, and the like.

Figure 11:
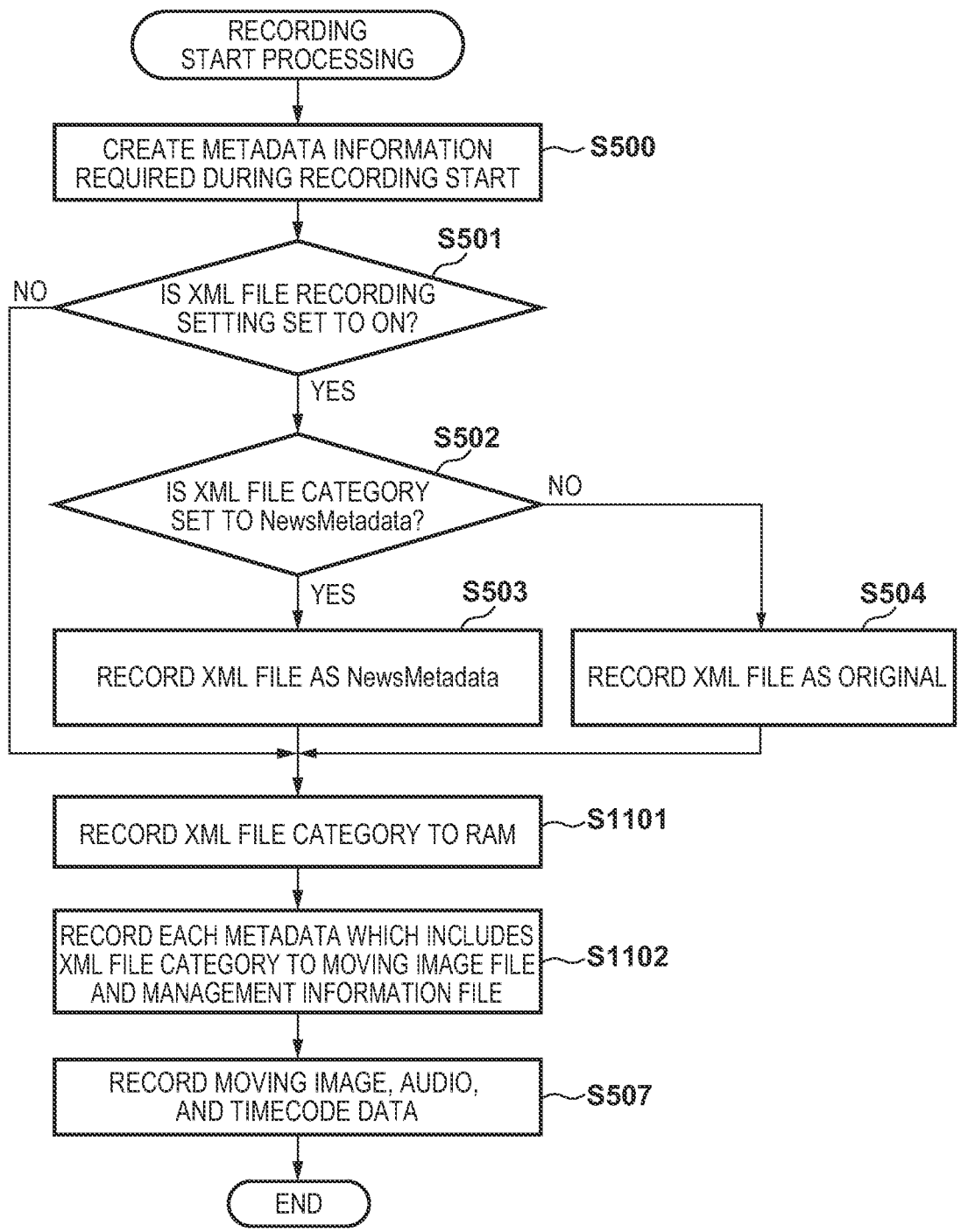
FIG. 11 is a flowchart illustrating the recording start processing of a digital video camera according to a second embodiment.

FIG. 11 is a flowchart illustrating the operations in a case where the user operates the console unit 16 and sends a recording start request to the control unit 10 of the digital video camera 100. The operations of the flowchart have much in common with the operations of the flowchart illustrated in FIG. 5A. Thus, these common parts are given the same step number and descriptions thereof are omitted.

In step S1101, the control unit 10 writes the category information of the XML file written to the management information file INDEX.MIF (1003) to the RAM 18.

In step S1102, the control unit 10 reads out the metadata information stored in the RAM 18 in step S500 and step S1101 and converts these to the format of the management information 1006 of the moving image file or the format of the management information INDEX.MIF (1003). Then, the metadata information 360 and 1012 are written to the detachable recording medium 20 as the management information 1006 of the moving image file or the management information file INDEX.MIF via the recording medium I/F 19.

Figure 12:
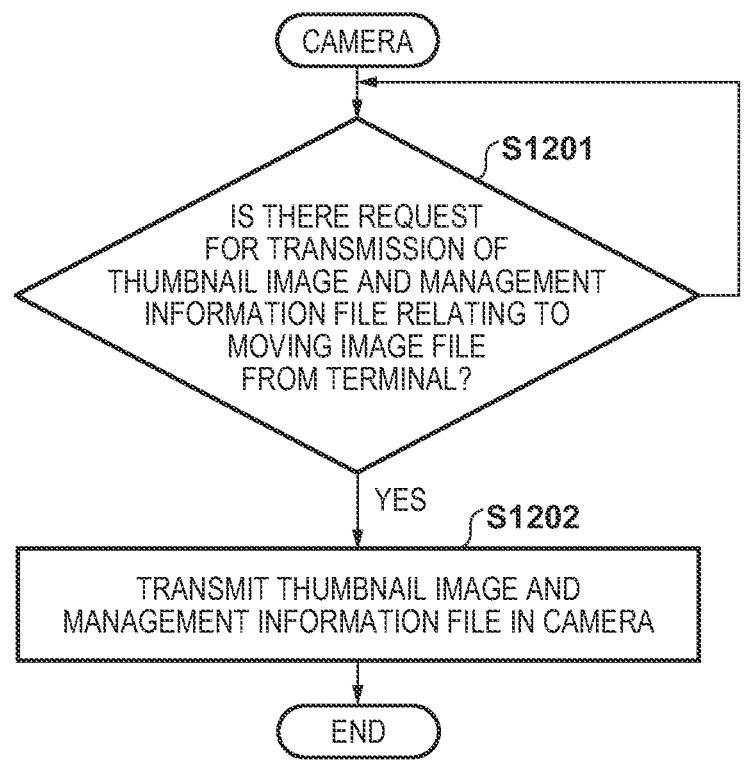
FIG. 12 is a flowchart illustrating the operations in a case where the digital video camera according to the second embodiment receives a request for transmission of a thumbnail image and metadata.

FIG. 12 is a flowchart illustrating the operations when the digital video camera 100 receives a request for transmission of a thumbnail image and management information file relating to the specified moving image file in the digital video camera 100 from the portable terminal 200.

In step S1201, the control unit 10 determines whether or not there is a request for transmission of a thumbnail image and management information file relating to a moving image file from an external apparatus via the wireless communication unit 14. In a case where the control unit 10 determines that there is a request for transmission of a thumbnail image and management information file relating to a moving image file, the processing proceeds to step S1202. If this is not determined, step S1201 is repeated.

In step S1202, the control unit 10 reads out and analyzes the thumbnail image and the management information file of the moving image file recorded in the detachable recording medium 20 relating to the specified moving image file from an external apparatus and loads them on the RAM 18. When the control unit 10 has finished reading out and analyzing the thumbnail image and the management information file, the control unit 10 uses the wireless communication unit 14 and transmits the thumbnail mage and the management information file to the outside.

Figure 13A:
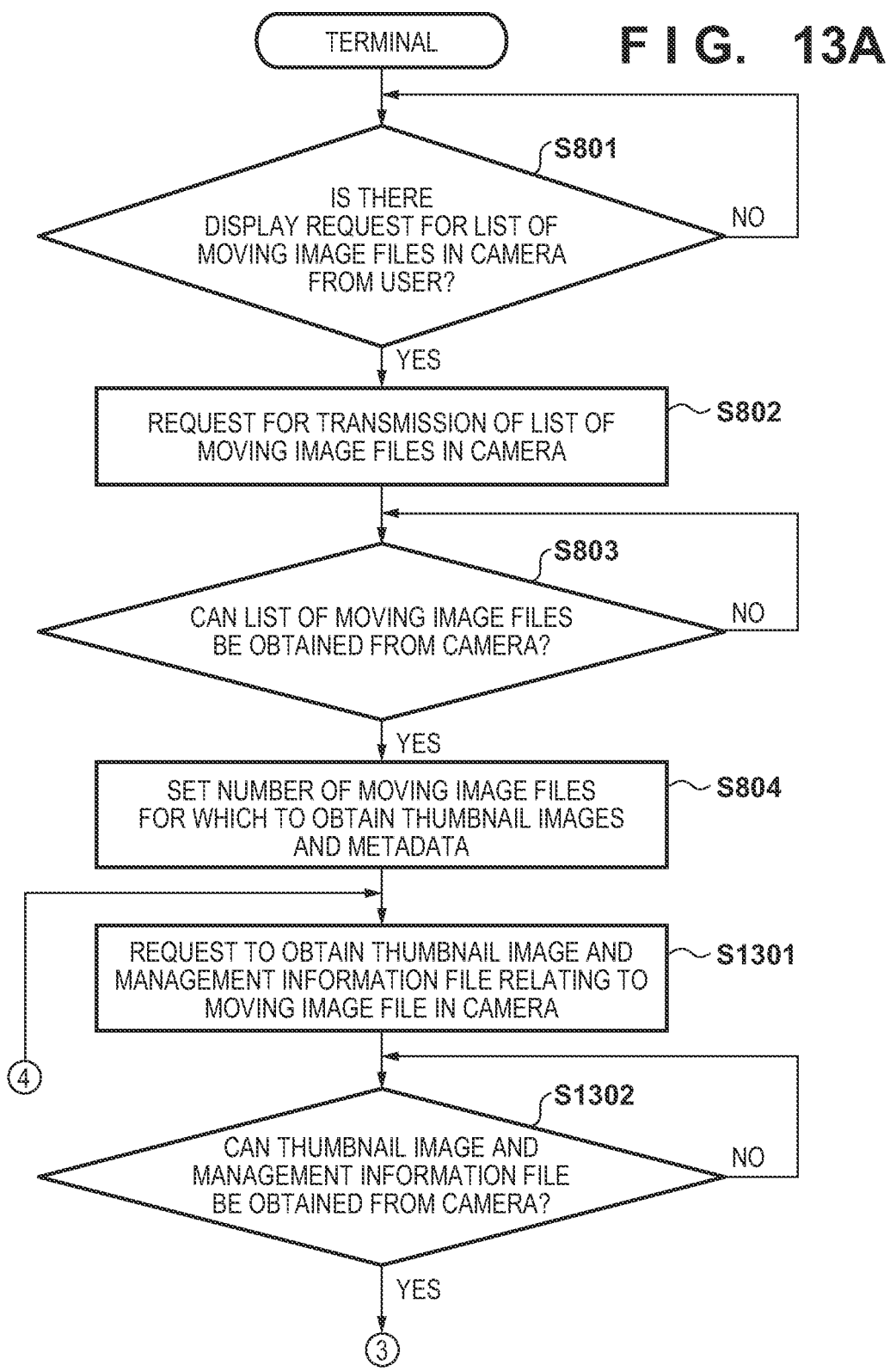
FIGS. 13A and 13B are flowcharts illustrating the operation of a portable terminal according to the second embodiment sending a request for transmission of a moving image file list to the digital video camera.
Figure 13B:
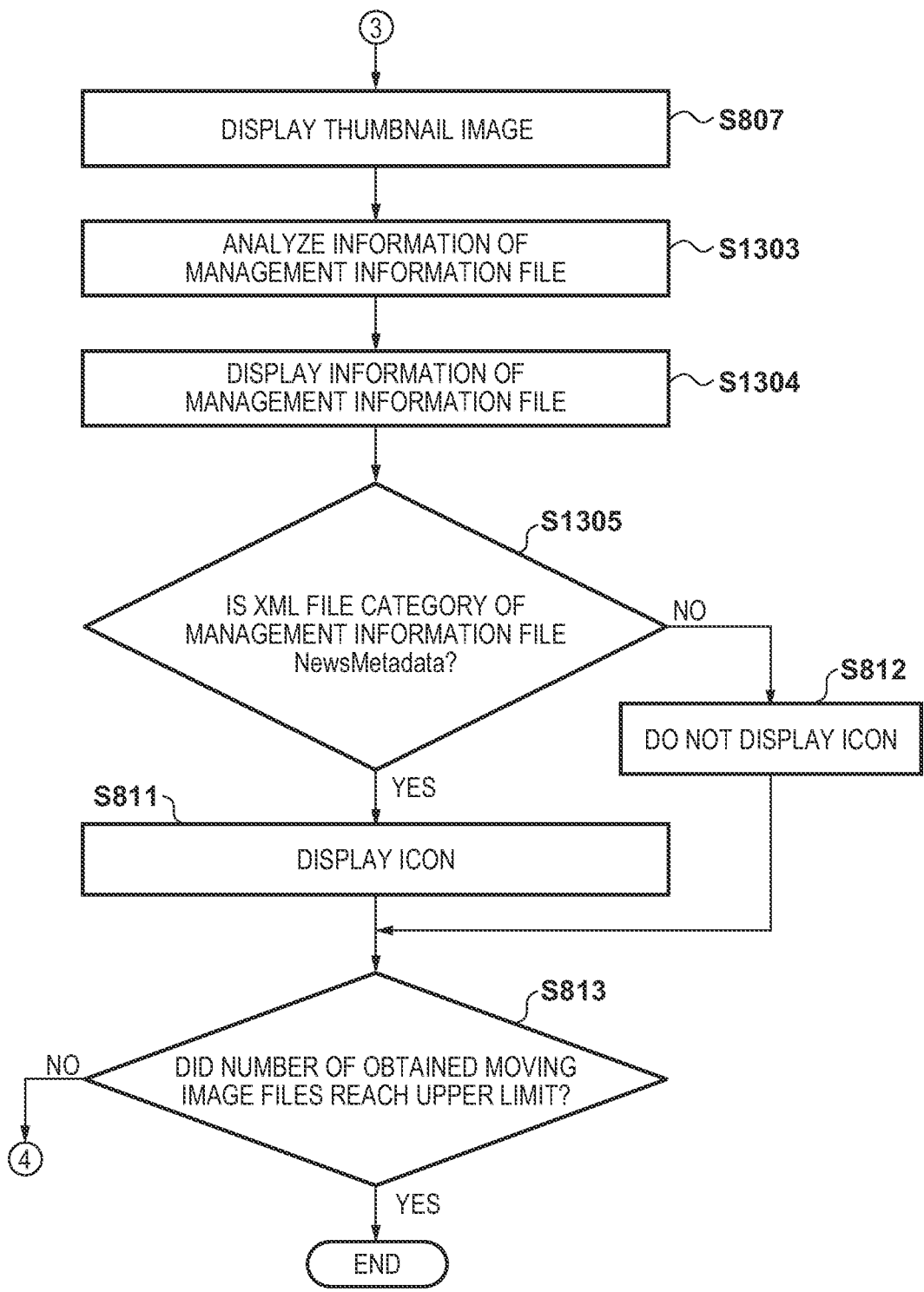

FIGS. 13A and 13B are flowcharts illustrating the operations in a case where a user has requested, via an operation on the portable terminal 200, a list of moving image files in the digital video camera 100 to be displayed. The operations of the flowchart have much in common with the operations of the flowchart illustrated in FIGS. 8A-1 and 8A-2. Thus, these common parts are given the same step number and descriptions thereof are omitted.

In step S1301, the control unit 21 sends a request for transmission of the thumbnail image and management information file to the digital video camera 100 via the wireless communication unit 24. At this time, the digital video camera 100 performs the operations described using FIG. 12.

In step S1302, the control unit 21 determines whether or not the thumbnail image and management information file have been obtained from the digital video camera 100 via the wireless communication unit 24. In a case where the control unit 21 determines that the thumbnail image and management information file have been obtained, the processing proceeds to step S807. If this is not determined, step S1302 is repeated.

In step S1303, the control unit 21 loads the management information file obtained via the wireless communication unit 24 on the RAM 26 and analyzes the management information file.

In step S1304, the control unit 21 displays a portion of the analyzed management information file on the display unit 22.

In step S1305, the control unit 21 determines whether or not the category of the XML file in the portion of the analyzed management information file is News Metadata. In a case where the category of the XML file is determined to be News Metadata, the control unit 21 proceeds the processing to step S811. If this is not determined, the processing proceeds to step S812.

As described above, in the second embodiment also, the moving image file recorded by the digital video camera 100 and the XML file and metadata information thereof are recorded. Also, the moving image file of the digital video camera 100 is obtained from the portable terminal 200, and the category of the XML file is obtained from the metadata information recorded in the moving image file. Thus, the category of the XML file can be displayed, and the contents of the XML file can also be displayed.

Third Embodiment

In the third embodiment, the configuration of the digital video camera 100 and the configuration of the portable terminal 200, functioning as an editing apparatus, is similar to that in the first embodiment illustrated in FIGS. 1 and 2. Also, the basic processing (the processing illustrated in FIGS. 5A, 5B, 7A to 7C, 8A, and 8B) is similar to that in the first embodiment, and thus only parts that are different from the first embodiment are described. In the third embodiment, the processing of the digital video camera 100 and the portable terminal 200 is described in a case where, even if the category of the XML file is the same, there is a file with a different data structure for the XML file metadata information. Such a situation is plausible in a case where, for example, when upgrading or downgrading the firmware of the digital video camera 100, the XML file is recorded at each grade, causing files with different XML file data structures to be created. The digital video camera 100 records, in the moving image file, the version information as the identification information for identifying the XML file data structure upon XML file recording. Then, the portable terminal 200 executes processing in accordance with the version information. Thus, the portable terminal 200 is able to appropriately handle XML files that, even if the XML file category is the same, have different a metadata information data structure.

Figure 14:
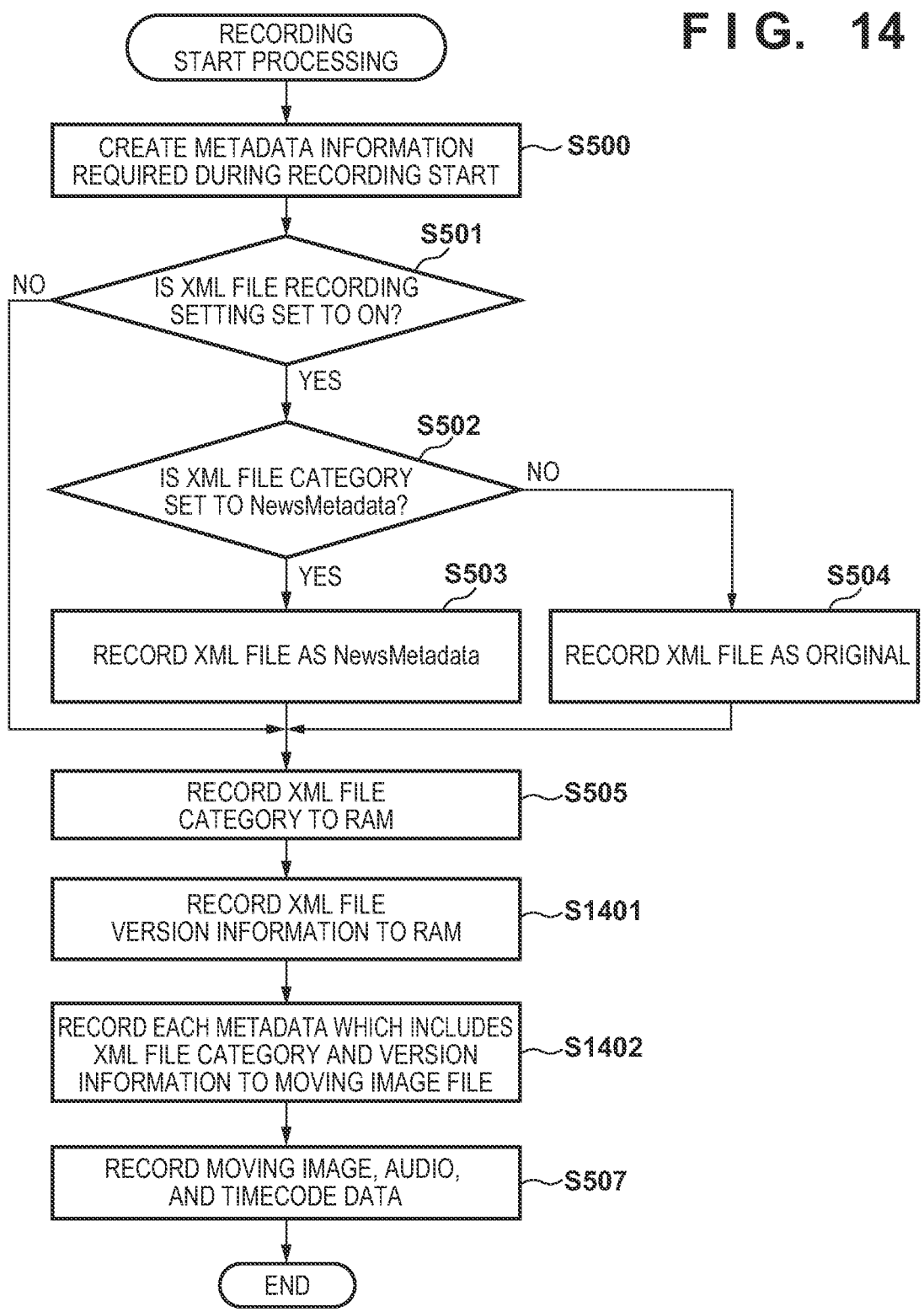
FIG. 14 is a flowchart illustrating the recording start processing of a digital video camera according to a third embodiment.

FIG. 14 is a flowchart illustrating the recording start processing of the digital video camera 100 in the present embodiment. FIG. 14 is a flowchart illustrating the operations in a case where the user operates the console unit 16 and sends a recording start request to the control unit 10 of the digital video camera 100. The operations of the flowchart are basically the same as that of the flowchart illustrated in FIG. 5A, except for one part. Thus, this common part is given the same step number and the description thereof is omitted, with only the different part being described.

In step S1401, the control unit 10 reads out the version information of the data structure of the XML file recorded in advance in the ROM 17 and writes the read version information to the RAM 18 as metadata information to be written to the management information 326 of the moving image file. Note that in the present embodiment, in a case where the file category is News Metadata, the version information is recorded in the same file, and in a case where the file category is not News Metadata, the version information is not recorded. Thus, in a case where the file category is not News Metadata, the processing of step S1401 is not executed. News Metadata is the NewsML-G2 standard, there is a possibility that the version of the standard is revised, and version information is recorded because it is plausible that there are many pieces of metadata and the operation and application method may change.

Next, in step S1402, the control unit 10 reads out the metadata information held in the RAM 18 in step S500, step S505, and step S1400, converts these to the format of the management information 326 of the moving image file, and issues an instruction to the recording medium I/F 19 for these to be written to the detachable recording medium 20. Then, using the recording medium I/F 19, metadata information including the metadata of when the recording started, the file category of the XML file, and the version information of the data structure is written to the detachable recording medium 20 as the management information 326 of the moving image file, which is a portion of the moving image file. In a case where the moving image file is an MP4 format, the processing described above is executed. In a case where the moving image file is an MXF format, preferably, in the management file (INDEX.MIF) according to the second embodiment, a region is defined for storing the version information of the data structure of the XML file and recorded. In other words, the control unit 10 reads out the metadata information stored in the RAM 18 in step S500, step S505, and step S1400. Then, the metadata information including the metadata of when the recording started, the file category of the XML file, and the version information of the data structure is converted to the format of the management information 1006 of the moving image file or the format of the management information file INDEX.MIF (1003). The converted information is written to the detachable recording medium 20 as the management information 1006 of the moving image file or the management information file INDEX.MIF.

As described above, in the third embodiment, not only is the file category of the XML file recorded to the management information 326, but the version information of the data structure is also recorded. However, no such limitation is intended.

The standard of the metadata recorded in the XML file may be revised and the version information may be changed due to a change to the operation or application method of the XML file. In the present embodiment, because the version information is recorded in the moving image file or the management information file, the version of the data structure of the XML file can be determined without reading the XML file. Various definitions can be applied to the version information of the data structure. In a case where an XML file of the NewsML-G2 standard is recorded, version information different to the version defined in the standard may be used. In other words, with the digital video camera 100, as long as the type of metadata recorded in the XML file, i.e., the data structure of the XML file, can be identified, independently defined version information may be used.

Furthermore, in a case where the operation or application method of the XML file is different depending on the region where the digital video camera 100 is used, the data structure of the XML file can be expected to be a data structure compliant with the region of use. Thus, the version information may be different depending on the region of use. Alternatively, as well as the version information of the data structure, destination information indicating the region of use may be also recorded in the management information of the moving image file and the management information file. Also, instead of the version information, destination information may be recorded. For the destination information, a country name code may be described using letters of the alphabet, or region information may be described.

Figure 15B:
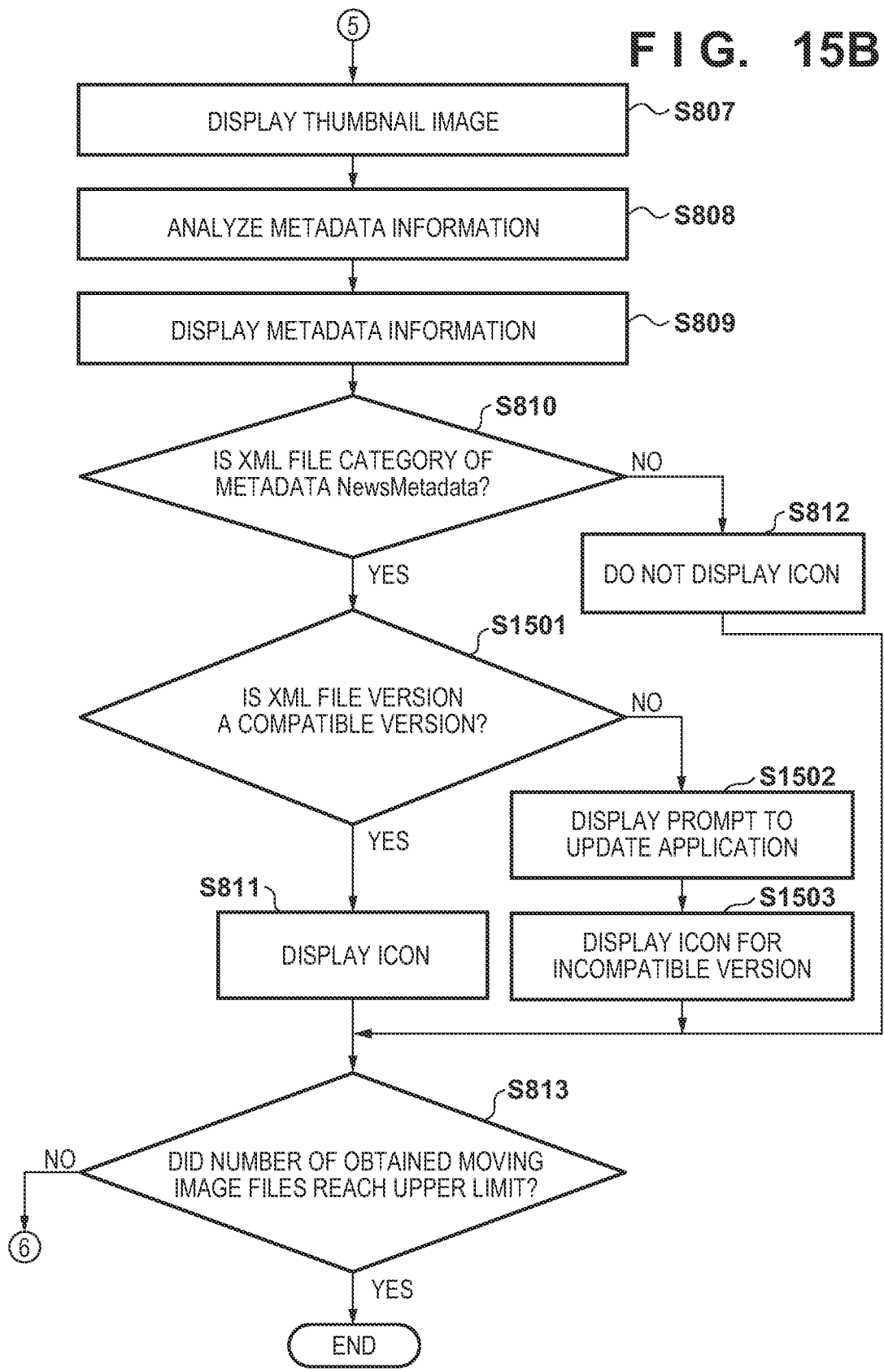

FIGS. 15A and 15B are flowcharts illustrating the operations in a case where a user has requested, via an operation on the portable terminal 200, a list of moving image files in the digital video camera 100 to be displayed. The operations of the flowchart are basically the same as that of the flowchart illustrated in FIGS. 8A-1 and 8A-2 except for one part. Thus, this common part is given the same step number and the description thereof is omitted, with only the different part being described.

In step S810, in a case where the XML file category of the metadata of the moving image file is determined to be News Metadata, the processing proceeds to step S1501. In step S1501, the control unit 21 determines the version information of the data structure of the XML file in a portion of the metadata information of the moving image file loaded on the RAM 26. In a case where the control unit 21 determines that the version information is a version that is compatible with the software program (application) currently being executed by the portable terminal 200, the processing proceeds to step S311. Otherwise, the processing proceeds to step S1502.

In step S1502, because the XML, file includes metadata that is not compatible with the software program (application) currently being executed, the control unit 21 causes the display unit 22 to display a prompt for the user to update the application. The control unit 21 may further determines whether or not the application is the latest state and may display a display prompting the user to update only in a case where the application is not the latest state. Also, the control unit 21 may cause a display prompting the user to update to be displayed only in a case where updating the application will make it compatible with the version of the XML file. Note that this may not be displayed if it has been displayed once previously.

In a case where the version information is not a version that is compatible with the software program (application) currently being executed by the portable terminal 200, there is a possibility that the XML file metadata cannot be displayed or a portion of the metadata cannot be displayed. Thus, in step S1503, the control unit 21 displays, in the corresponding moving image file display field, an icon, such as an icon 908 in FIG. 9D, different to the normal icon 905 indicating that the News Metadata is a incompatible version. Note that, as described in the first embodiment, even in a case where the XML file category is determined to not be News Metadata, if there is an XML file relating to the moving image file, an icon may be displayed. Here, in a case where the file category is not News Metadata, the control unit 21 preferably displays an icon without determining the version information in step S1501.

FIGS. 16A and 16B are diagram illustrating an example of the data structure of a News Metadata XML file. FIG. 16A illustrates the data structure of version 1.0, and FIG. 16B illustrates the data structure of version 2.0.

News Metadata is described using the XML format, nodes have a hierarchical structure, and detailed data specified using the XML format, such as elements and attributes, are described in some of the nodes.

The versions are different, with version 1.0 including information indicating the nodes following on from <organizationDetails> denoted by 1601 in FIG. 16A. This is not included in version 2.0.

Also, in version 2.0, a <versionCreated> node and a <firstCreated> node and the nodes following on from <contentMeta> as denoted by 1602 and 1603 in FIG. 16B are included. However, version 1.0 is different in that these are not included.

Thus, in the portable terminal 200, the control unit 21 obtains the XML file, analyzes the XML file in step S817, and displays the contents of the XML file in step S818, where at this time analysis and display is performed in accordance with the version information.

When analysis and display of the XML file is performed in accordance with the version of the data structure by the control unit 21, as illustrated in FIGS. 17A and 17B, a table listing the corresponding node information for each version is referenced.

FIG. 17A is a table listing information relating to the data structure, i.e., each node forming the structure, corresponding to version 1.0. FIG. 17B is a table listing information relating to the data structure, i.e., each node forming the structure, corresponding to version 2.0. Note that the information corresponding to the table listing the information relating to each node illustrated in FIGS. 17A and 17B is stored in advance in the ROM 25 and referenced by the control unit 21.

The tables in FIGS. 17A and 17B include the name of the node, the name of the parent node of the node, the hierarchy of the node, and information indicating whether or not the node includes information to be read. The control unit reads out the table corresponding to the version of the XML file from the ROM 25, reads out information from the target node of the XML file on the basis of the information described in the read out table, and displays the read out information on the display unit 22.

Note that for the method of referencing the described node information or the like from the XML file, typical known model, such as Document Object Model (DOM), Simple API for XML (SAX), or the like may be used.

Note that in the embodiment described above, identification information for identifying the data structure is used as the version information, but the present disclosure is not limited to this method. As described above, information indicating the destination region or the region may be used, and any information can be used that allows the data structure to be identified.

As described above, according to the third embodiment, identification information for identifying the data structure of the XML file is recorded in the moving image file. Thus, the version of the XML file can be known without obtaining the XML file, and appropriate actions in accordance with the XML file can be taken.

Also, in the embodiment described above, the moving image file is an MP4 file. However, the present disclosure may be applied in a case where the moving image file is an MXF file. In this case, the second embodiment and the third embodiment are preferably combined. In other words, in the digital video camera 100, the file category as well as the version information (identification information) is recorded in the management information file. Also, in the portable terminal 200, preferably, when the thumbnail image is displayed, the thumbnail image and the management information file is requested and the icon 905 and the like are displayed depending on the file category included in the management information the and the version information.

Other Embodiments

Preferred embodiments according to the present disclosure have been described above. However, the present disclosure is not limited to these specific embodiments and include various embodiments without departing from the scope of the claims. Parts of the embodiments described above may be combined as appropriate. For example, in the digital video camera 100, depending on the format of the moving image file set upon recording, the recording processing of the first embodiment and the recording processing of the second embodiment may be switched between. Also, in the portable terminal 200, the recording processing of the second embodiment may be switched to depending on the format of the displayed moving image file.

Also, a software program for implementing the functions of the embodiments described above being supplied to a system or an apparatus including a computer capable of executing the program directly from a recording medium or via wired or wireless communication and being executed is also included in the present disclosure.

Accordingly, because the functional processing of the present disclosure is implemented using a computer, a program supplied to the computer and installed also may implement the present disclosure. In other words, a computer program for implementing the functional processing of the present disclosure is included in the present disclosure.

In this case, as long as the functions of the program are provided, the object code, the program executed by the interpreter, the script data supplied to the OS, or any similar program form can be used.

For the recording medium for supplying the program, for example, a magnetic recording medium such as a hard disk gin magnetic tape, an optical or magneto-optical recording medium, or a non-volatile semiconductor memory may be used.

Also, a plausible method for supplying the program includes storing the computer program for implementing the present disclosure on a server on a computer network and a connected client computer downloading the computer program.

INDUSTRIAL APPLICABILITY

Note that in the embodiments described above, the present disclosure is applied to a digital video camera. However, the present disclosure is not limited to this example. In other words, the present disclosure may be applied to any device with an image sensor. That is, the present disclosure may be applied to any apparatus capable of image capture, such as a mobile phone terminal, a portable image viewer, a television with a camera, a digital photo frame, a music player, a game console, an electric, book reader, or the like. The present disclosure may also be applied to an apparatus not capable of capturing an image but configured to obtain a captured image from an external apparatus and record the obtained image. Also, the present disclosure relating to the configuration for reproducing a moving image according to the embodiments described above can be applied to an image processing apparatus without an image-capture function.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2021-103550, filed Jun. 22, 2021 and 2021-108056, filed Jun. 29, 2021 which are hereby incorporated by reference herein in their entirety.

What is claimed is:

1. An electronic device comprising:
   at least one processor configured to function as:
   a communicating unit configured to communicate with a recording apparatus, the recording apparatus configured to record, to a recording medium, a moving image file including video data and an additional information file, which is a file of additional information of the video data, the recording apparatus comprising at least one processor to function as:
   a receiving unit configured to receive a recording start request;
   a setting unit configured to set a data structure of the additional information file to either a first category or a second category based on a user instruction;
   a generating unit configured to automatically generate an additional information file in a data structure corresponding to the category set by the setting unit according to the recording start request; and
   a control unit configured to perform control to record identification information for identifying the data structure of the additional information file in the moving image file according to the category set by the setting unit; and
   a second control unit configured to obtain the identification information of the additional information file without obtaining the additional information file from the recording apparatus by obtaining, from the recording apparatus via the communicating unit, the moving image file in which the identification information identifying the data structure of additional information file is recorded,
   wherein the second control unit
   performs control to obtain a thumbnail image and the identification information recorded in the moving image file via the communicating unit and display the obtained thumbnail image on a display unit; and
   performs control to display a display item indicating the first category or the second category of the additional information file corresponding to the moving image file on the basis of the identification information together with the thumbnail image,
   without analyzing content of the additional information file.

2. The electronic device according to claim 1, wherein
   the additional information file is in a NewsML-G2 format standardized by International Press Telecommunications Council (IPTC); and
   the identification information is information relating to a version of a NewsML-G2 standard.

3. The electronic device according to claim 1, wherein
   the additional information file is in a NewsML-G2 format standardized by International Press Telecommunications Council (IPTC); and
   the identification information is version information other than a NewsML-G2 standard version that is compatible with an operation or application method of the additional information file.

4. The electronic device according to claim 1, wherein
   the identification information is destination information indicating a region for use.

5. The electronic device according to claim 1, wherein
   the second control unit performs control to display different display items in a case where the obtained identification information is identification information that is compatible with the electronic device and in a case where the obtained identification information is identification information that is not compatible.

6. The electronic device according to claim 1, wherein
   the second control unit performs control to display a display prompting for software update on a display unit in a case where the obtained identification information is not identification information compatible with the electronic device.

7. The electronic device according to claim 1, wherein
   the second control unit obtains, from the recording apparatus via the communicating unit, category information indicating a category of the additional information file recorded in the file other than the additional information file and, in a case where the obtained category information is a specific file category, performs control based on the identification information and, in a case where the obtained category information is not a specific file category, does not perform control based on the identification information.

* * * * *